(12) United States Patent
Chalasani et al.

(10) Patent No.: US 9,560,414 B1
(45) Date of Patent: Jan. 31, 2017

(54) METHOD, APPARATUS AND SYSTEM FOR DYNAMIC CONTENT

(71) Applicant: Cinemagram Inc., San Francisco, CA (US)

(72) Inventors: Temoojin Chalasani, San Francisco, CA (US); Marc Provost, San Francisco, CA (US)

(73) Assignee: Cinemagram Inc., San Francisco, CA (US)

( * ) Notice: Subject to any disclaimer, the term of this patent is extended or adjusted under 35 U.S.C. 154(b) by 184 days.

(21) Appl. No.: 14/588,774

(22) Filed: Jan. 2, 2015

Related U.S. Application Data

(63) Continuation of application No. 13/690,178, filed on Nov. 30, 2012, now Pat. No. 8,957,915.

(60) Provisional application No. 61/659,644, filed on Jun. 14, 2012.

(51) Int. Cl.
*H04N 21/472* (2011.01)
*G11B 27/031* (2006.01)

(52) U.S. Cl.
CPC ....... *H04N 21/47205* (2013.01); *G11B 27/031* (2013.01)

(58) Field of Classification Search
None
See application file for complete search history.

(56) References Cited

U.S. PATENT DOCUMENTS

| | | |
|---|---|---|
| 6,278,466 B1 | 8/2001 | Chen |
| 8,692,940 B2 * | 4/2014 | Luo ............. G11B 27/034 348/700 |
| 9,373,187 B2 * | 6/2016 | Ugur ............ G06K 9/34 |
| 2003/0146915 A1 | 8/2003 | Brook et al. |
| 2005/0225566 A1 | 10/2005 | Kojo |
| 2007/0279494 A1 | 12/2007 | Aman et al. |
| 2009/0058842 A1 * | 3/2009 | Bull ............. G06F 3/14 345/212 |
| 2011/0047223 A1 * | 2/2011 | Naftali-Menajed ..... H04L 12/58 709/206 |
| 2011/0091182 A1 * | 4/2011 | Look ............ G11B 27/034 386/200 |
| 2011/0249086 A1 | 10/2011 | Guo et al. |
| 2011/0285748 A1 | 11/2011 | Slatter et al. |
| 2013/0050253 A1 | 2/2013 | Jooste |
| 2013/0229581 A1 | 9/2013 | Joshi et al. |

(Continued)

OTHER PUBLICATIONS

Girgensohn, "A Semi-automatic Approach to Home Video Editing", UIST'00, San Diego, CA, 2000, ACM 1-58113-21-3/00/11, see p. 83.*

(Continued)

*Primary Examiner* — Maurice L McDowell, Jr.

(74) *Attorney, Agent, or Firm* — Rhodes Donahoe, LLC; Robert V. Donahoe

(57) ABSTRACT

Methods, apparatus and systems are employed to generate a dynamic content, for example, a looping video using an application operating on a device including a graphical user interface presented in a display. In some embodiments, a video stream including audio is acquired by employing the graphical user interface to operate an application displayed in the graphical user interface and a continuous loop is generated from the acquired video stream, the application automatically limiting a length of the continuous loop to a maximum amount of time pre-determined by the application.

18 Claims, 14 Drawing Sheets

(56) References Cited

U.S. PATENT DOCUMENTS

| | | | |
|---|---|---|---|
| 2014/0071137 A1* | 3/2014 | Kannan | G11B 27/034 345/473 |
| 2014/0078398 A1* | 3/2014 | Shenoy | G11B 27/034 348/515 |
| 2015/0324096 A1* | 11/2015 | Leblanc | G11B 27/034 715/720 |

OTHER PUBLICATIONS

Tompkin, James, et al."Towards momentary imagery: Automatic cinemagraphs." Visual Media Production (CVMP), 2011 Conference for IEEE, 2011.
Guy Malachi, "Kinotopic," Jan. 23, 2012, http://lightenapp.com/2012/01/kinotopic.html.

* cited by examiner

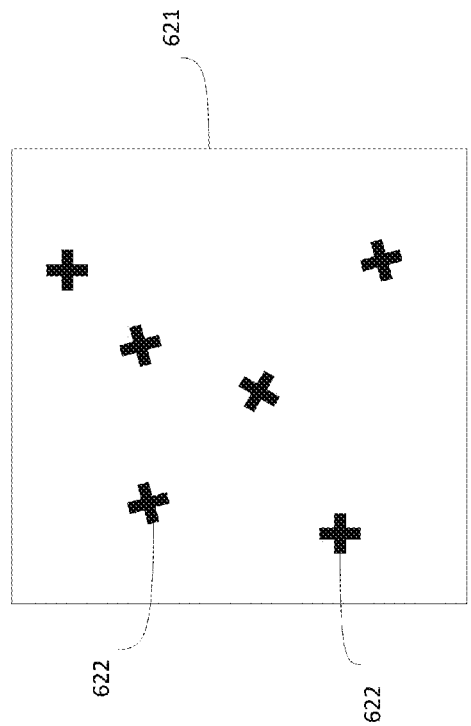
FIG. 6
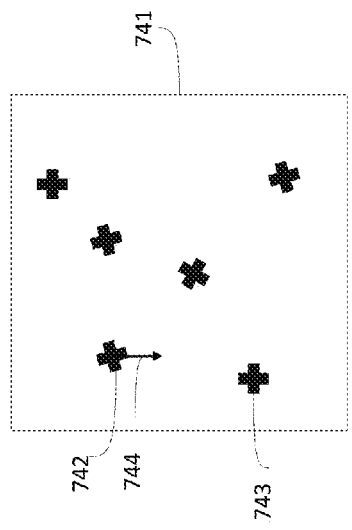
FIG. 7
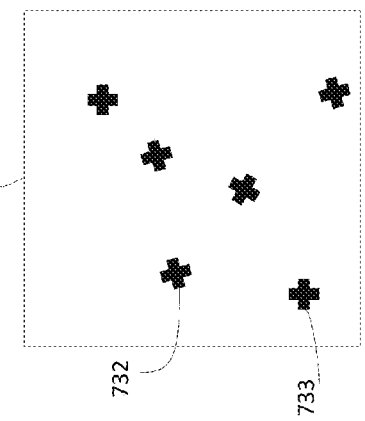

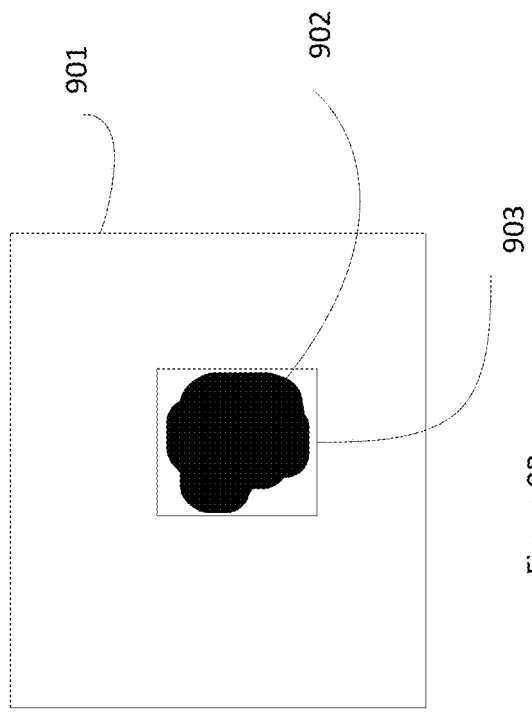
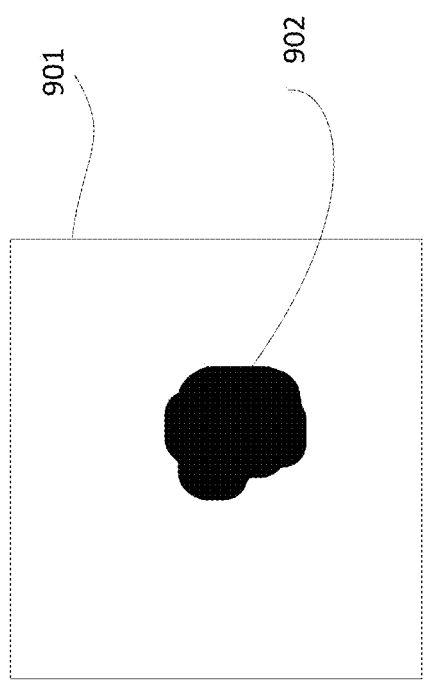
Figure 9B
Figure 9A

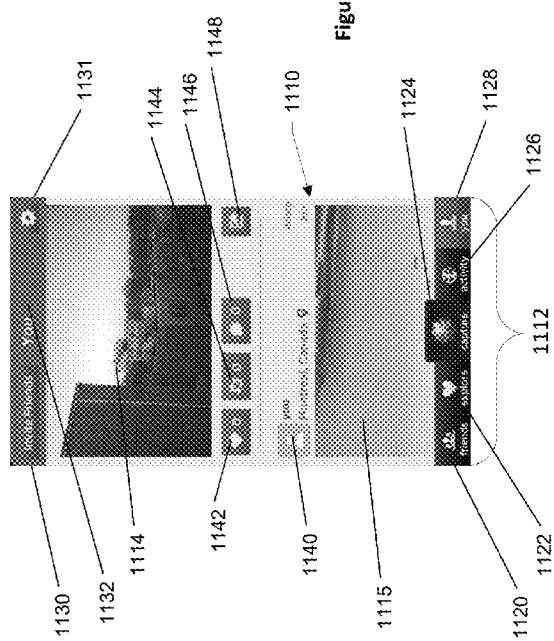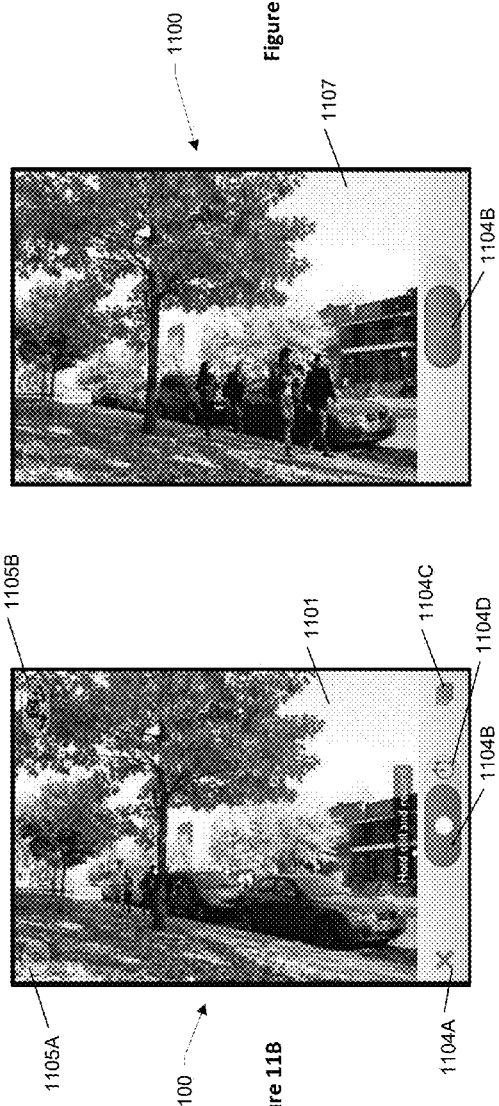

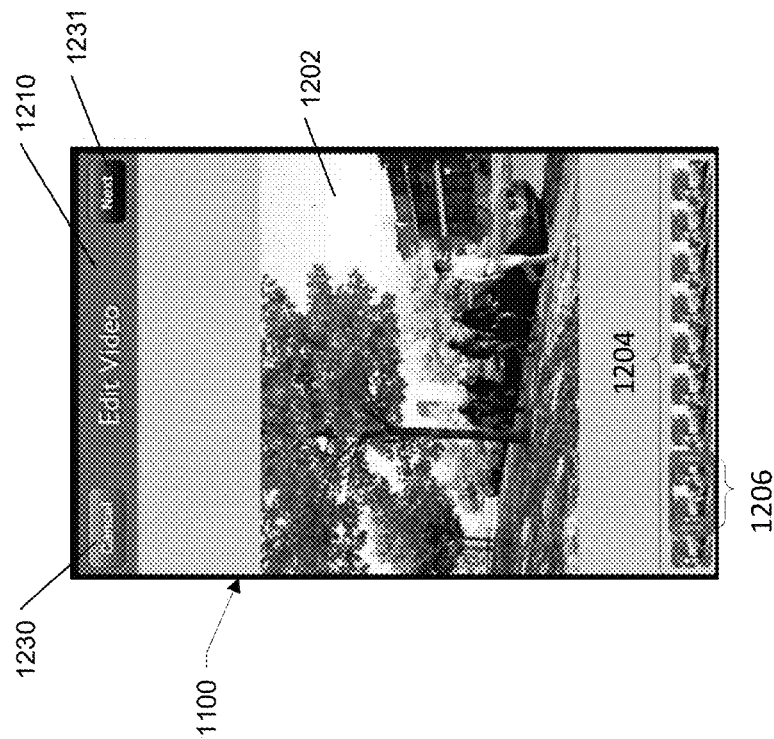
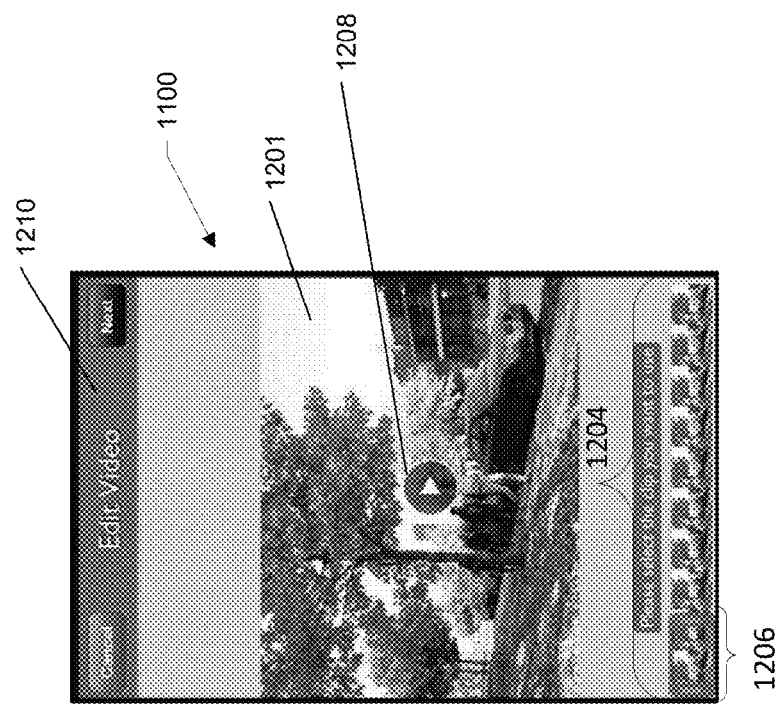
Figure 12B
Figure 12A

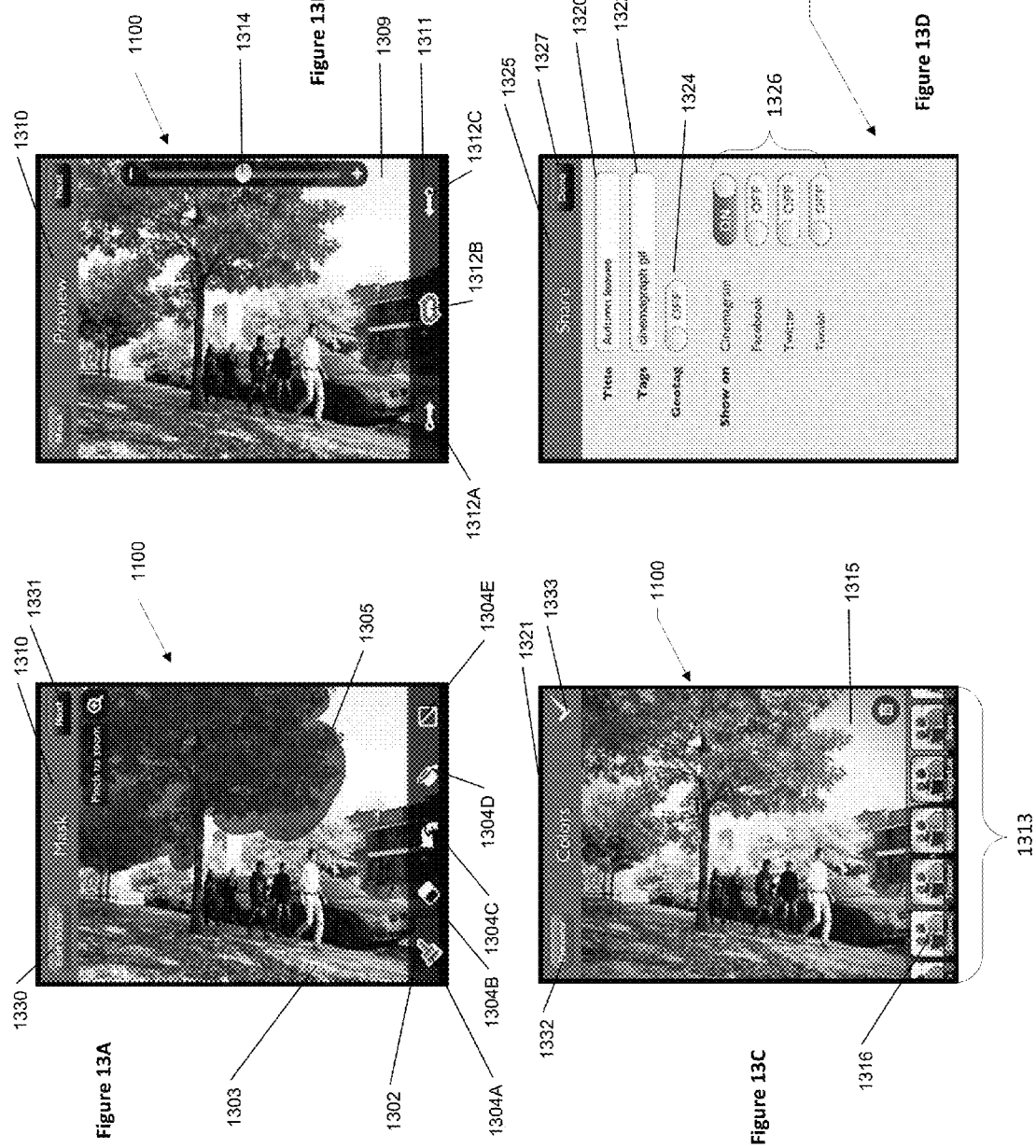

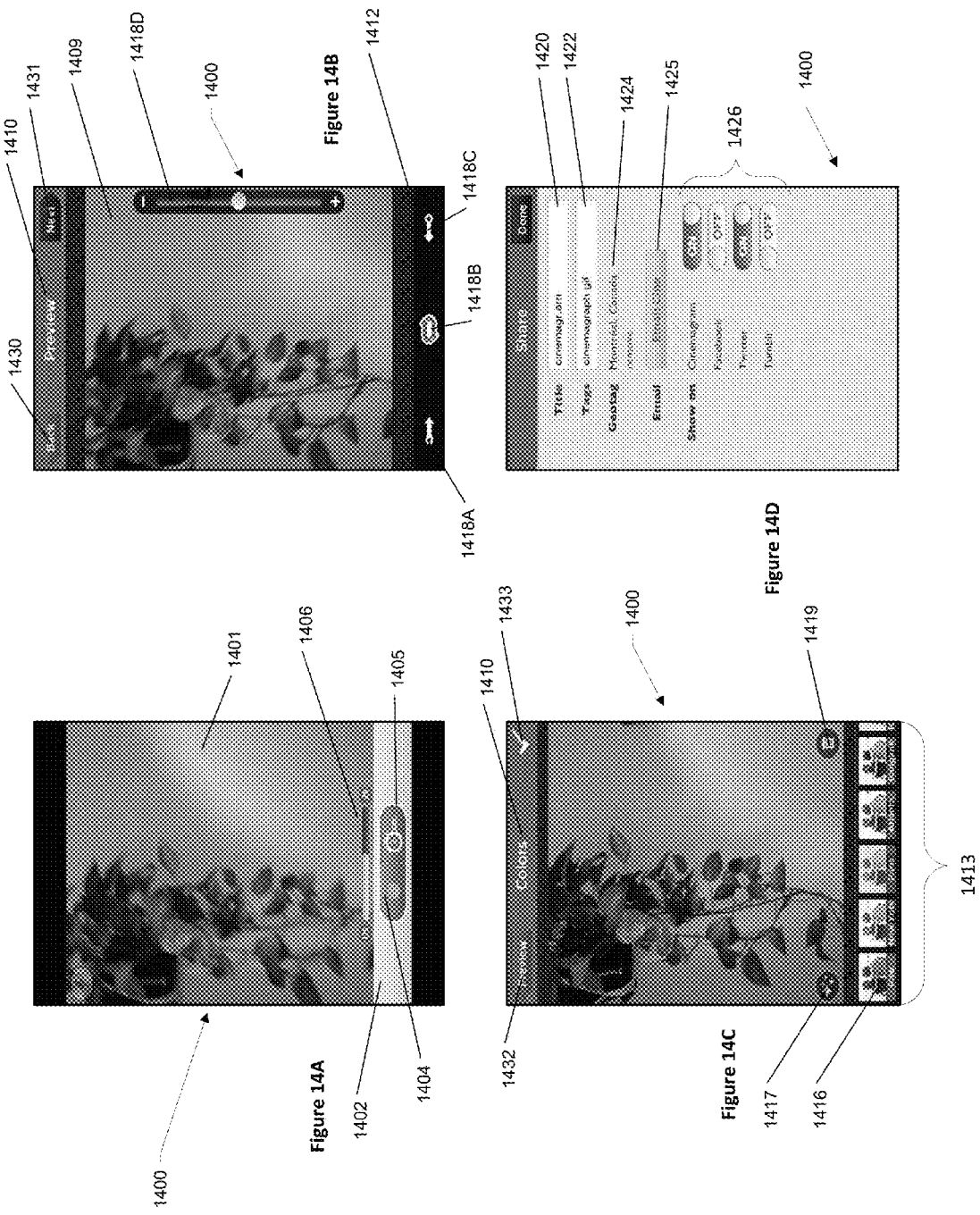

METHOD, APPARATUS AND SYSTEM FOR DYNAMIC CONTENT

RELATED APPLICATIONS

The application is a continuation of U.S. application Ser. No. 13/690,178 entitled "METHOD, APPARATUS AND SYSTEM FOR DYNAMIC IMAGES" filed Nov. 30, 2012, which claims the benefit under 35 U.S.C. §119(e) to U.S. Provisional Application Ser. No. 61/659,644, entitled "METHOD AND SYSTEM FOR CREATING ANIMATED IMAGES," filed on Jun. 14, 2012, each of the preceding applications is herein incorporated by reference in its entirety.

BACKGROUND OF INVENTION

1. Field of Invention

This invention relates generally to methods, apparatus and systems for creating dynamic images.

2. Discussion of Related Art

Today, photographic and video equipment is readily available to anyone in possession of a smart phone. The result is a widespread use of smart phones to photograph and video all aspects of daily activities. The availability of the Internet and wireless networks to connect different devices allows users to quickly share this content with other users. In general, basic video editing tools available with a smart phone provide a tool by which an end user can stitch together a video that they wish to share. However, even basic video editing can be time-consuming and tedious using a mobile device. Further, more involved video editing requires professional grade editing equipment that is generally not available with a smart phone or other mobile device.

For example, professionals in the fashion industry employ computers to generate cinemagraphs that include an otherwise still frame with a localized animated region. These professionals have access to expensive, high-end photography and image processing equipment that allows them to generate the cinemagraphs, for example, using a personal computer. However, such video editing equipment is not available to most individuals because of the high cost. In addition, the processing power required to achieve these results today is unavailable in smart phones and other portable devices. Further, even high-end image processing systems require the user to individually and manually edit each image in a stream of images to create the cinemagraph.

SUMMARY OF INVENTION

Therefore there is a need for efficient apparatus, systems and methods for creating dynamic images which provide a unique way of expressing ideas and events to users on the network. In some embodiments, these apparatus, systems and methods provide tools to generate dynamic images on smart phones and other portable devices. These tools allow for generation of images at high frame rates and high resolutions with an application that has a relatively small size. Further, various embodiments can allow a user to easily create the dynamic image using processes that include stabilization, filtering and other sophisticated video effects with a greatly reduced number of interactions with the mobile device. According to further embodiments, a minimum number of touch inputs on the display of the mobile device are required to generate and share these sophisticated looking and customized dynamic images. Further, some embodiments maximize the use of memory and computing modules such as central processors and graphics processors, in portable devices while allowing the generation of the user-selected dynamic image.

As used herein, the term "dynamic image" refers to an image that includes at least a portion having animation. As used herein, the term "animate" refers to an act of adding an appearance of movement and the term "animated" refers to an object or image that includes apparent movement. As used herein, the term "animation" refers to a state including apparent movement.

In one aspect, a computer-implemented method for creating a dynamic image, includes acts of: acquiring a first stream of images; receiving a region defining a mask in at least one image included in the first stream of images; selecting a first image from the first stream of images and automatically blending the first image with a region of others of the images included in the first stream of images, respectively, in accordance with the mask; and generating a dynamic image from a second stream of images. According to these embodiments, the second stream of images includes the first image and the respective regions of the other images included in the first stream of images and the dynamic image includes an animated region having animation determined by the blending of the respective regions.

In another aspect, a computer implemented method for creating a dynamic image using a graphical user interface presented in a display of a user device, includes: receiving a first input to the graphical user interface to acquire a stream of images; receiving a second input to the graphical user interface to select a region in one image included in the stream of images; and generating a dynamic image from the stream of images, the dynamic image including an animated region having animation determined by the selected region.

In still another aspect, an apparatus includes a display, one or more processors; and a computer storage medium storing instructions that, when executed by the one or more processors, cause the one or more processors to perform operations. In some embodiments, these operations include receiving a first stream of images; receiving a region defining a mask in at least one image included in the first stream of images; selecting a first image from the first stream of images and automatically blending the first image with a region of others of the images included in the first stream of images, respectively, the respective regions identified using the mask; and generating a dynamic image from a second stream of images. According to these embodiments, the second stream of images includes the first image and the respective regions of the other images included in the first stream of images and the dynamic image includes an animated region having animation determined by the blending of the respective regions.

In still a further aspect, an apparatus includes a display; one or more processors coupled to the display; and a computer storage medium storing instructions. In some embodiments, the instructions when executed by the one or more processors, cause the one or more processors to perform operations including: rendering a graphical user interface in the display; receiving a first input to the graphical user interface to acquire a stream of images; receiving a second input to the graphical user interface to select a region in one image included in the stream of images; and generating a dynamic image from the stream of images, the dynamic image including an animated region having animation determined by the selected region. According to one embodiment, the operations include generating the dynamic image following the second input and independent of any further inputs subsequent to the first input and the second input. According to a further embodiment, the operations include generating the dynamic image following the second input, independent of any further inputs and with the second input being the only user input subsequent to the first input provided in advance of the generation of the dynamic image.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 6 illustrates an image including a plurality of features in accordance with one embodiment;

FIG. 7 illustrates a first image and a second image including a plurality of features in accordance with a further embodiment;

FIG. 9A illustrates an image including a selected region in accordance with one embodiment;

FIG. 9B illustrates the image of FIG. 9A in accordance with a further embodiment;

FIG. 11A illustrates a user interface employed with a dynamic-image application in accordance with one embodiment;

FIGS. 11B-11C illustrate a user interface presented in a touch display for recording video in accordance with one embodiment;

FIGS. 12A-12B illustrate a user interface presented in the touch display for selecting a stream of images in accordance with one embodiment;

FIG. 13A illustrates a user interface presented in the touch display for selecting a mask in accordance with one embodiment;

FIGS. 13B-13C illustrate a user interface presented in the touch display for adding effects to a dynamic image in accordance with one embodiment;

FIG. 13D illustrates a user interface presented in the touch display for sharing a dynamic image in accordance with a further embodiment; and FIGS. 14A-14D illustrate a user interface presented in the touch display for generating, adding effects to and sharing a dynamic image in accordance with another embodiment.

DETAILED DESCRIPTION

Figure 1:
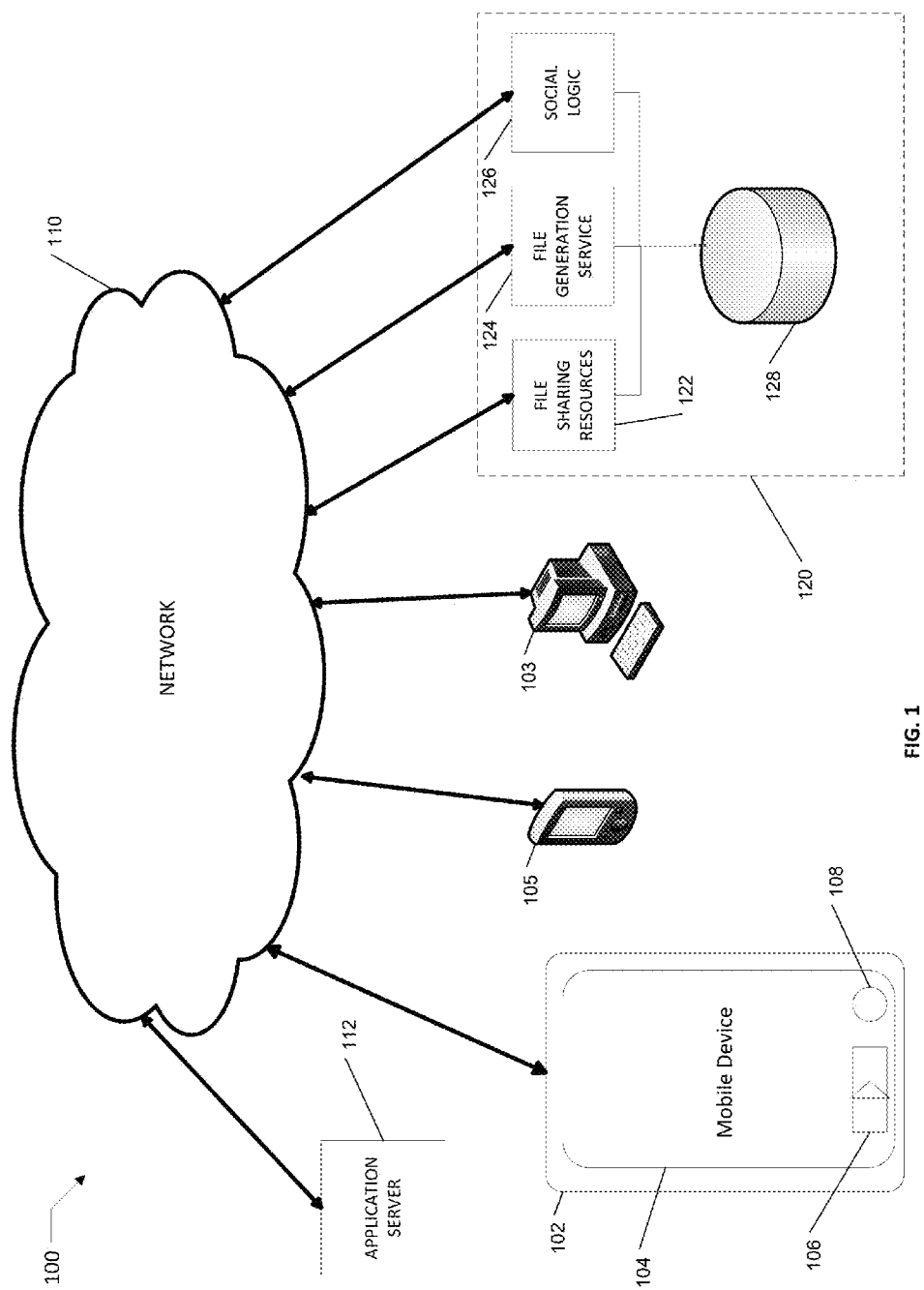
FIG. 1 illustrates a system including a network operating environment for a device.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

FIG. 1 illustrates a system 100 including a network operating environment for a device 102 that can be used to create dynamic images according to one embodiment. In accordance with the illustrated embodiment, the system includes a mobile device 102, a stationary device 103, additional user devices 105, a network 110, an application server 112 and services 120, for example, services and/or resources remotely accessible by the devices 102, 103, 105 for use in creating dynamic images. In the illustrated embodiment, the services 120 include file sharing resources 122, file generation services 124, social logic 126 and one or more databases 128. The services 120 and resources are described in more detail herein. As should be apparent to one of ordinary skill in the art in view of the disclosure provided herein, the services 120 can include other services and/or resources and combinations of services and/or resources depending upon the embodiment.

In general, the network 110 can include either or both of local-area networks (LANs), wide area networks (WANs), wireless communication, wired communication and may include the Internet. According to a further embodiment, the network 110 provides access "over-the-cloud" to one or more remote devices, servers, application resource management and/or data storage systems. For example, the network 110 can allow communication between any of the mobile device 102, the stationary device 103, and the other user devices 105 with one another and/or with any of the other resources and devices coupled to the network 110. Communication can occur using any of Wi-Fi networks, Bluetooth™ communication, cellular networks, satellite communication, and peer-to-peer networks available either alone or in combination with one another via the network 110. Other communication protocols and topologies can also be implemented in accordance with various embodiments. According to some embodiments, a plurality of the end user devices 102, 105, for example, mobile computing devices, and stationary devices 103 suitable for creating dynamic images communicate with and/or access the application server 112 and services 120 via the network 110.

According to various embodiments, the mobile device 102 and the other user devices 105 can be, for example any of a portable device such as a tablet computer, a hand-held computer, a personal digital assistant, a cellular telephone, a camera, a smart phone, and enhance general packet radio service (EGPRS) mobile phone, a media player, a navigation device, an e-mail device, a game console, a laptop computer, or a combination of any two or more of these processing devices and/or other processing devices. In one embodiment, the stationary device 103 is a desktop computer or other device having limited or no mobility but suitable for creating dynamic images.

As is described in more detail with reference to FIG. 3, the device 102 can include a general purpose processor (CPU), a graphics processing unit (GPU), a memory, a display 104 (for example, a touchscreen) and additional processing devices, for example, a compression/decompression module and/or a communication module. The device 102 may have a plurality of input/output interfaces and devices such as a mouse, a joystick, a touchscreen, a keyboard etc. Further, the device 102 may include any one or any combination of peripheral devices, for example, a positioning system, an RF transceiver, a motion sensor, a light sensor, a proximity sensor, one or more additional sensors, a camera, communications hardware and an audio including the speaker and/or annunciators.

In various embodiments, the devices 102, 103 and 105 can communicate with one or more services and/or resources via the network 110. In some embodiments, the services can include tools and resources that facilitate the creation and sharing of dynamic images.

In some embodiments, the device 102 includes a display 104 configured to present a user interface to a user of the device 102, for example, a graphical user interface (GUI). The display 104 can include OLED technology, LCD technology, light emitting polymer display technology or other display technology suitable for presenting information to a user in a visual format. According to some embodiments, the display 104 is touch screen display. According to these embodiments, the display 104 is sensitive/responsive to input selections made by the user contacting the face of the display 104. Such displays are sometimes referred to as haptic displays. According to some embodiments, the display 104 is sensitive to touch inputs received in proximity to, but not actually in contact with the display 104. In accordance with further embodiments, the device 102 can also include one or more additional touch-sensitive surfaces such as a trackpad or touchpad. In various embodiments, the device 102 can also include additional I/O devices such as pushbuttons and/or switches that are operable by the user.

According to some embodiments, the display 104 is responsive to multiple touch inputs applied simultaneously to the display by the user. According to these embodiments, the device processes the multiple inputs based on any of the pressure, degree, and/or position of each point of the inputs. These embodiments can allow for a wider range of touch inputs to be employed by the user. According to other embodiments, the device 102 can include a display in which contact is made using a stylus or other pointing device.

In general, the device 102 can display one or more graphical user interfaces on the display 104 to provide the user access to various system objects (for example, display objects 106 and 108) and for conveying information to the user. In the illustrated embodiment, the display objects 106 and 108 are graphic representations of objects employed in a system used to generate dynamic images. A non-exhaustive list of examples of such system objects include device functions such as record, pause and play, tools for applying and modifying stream of images, applications, windows, files, alerts, events or other visual references represented graphically. Accordingly, one or a plurality of icons can be rendered for viewing and/or selection in the display 104 via either a touch input or other input such as a cursor rendered in the display.

In general, the system 100 provides tools and functionality accessed by the mobile devices 102, stationary devices 103 and other user devices 105 to allow users of the devices to create and/or share dynamic images. According to some embodiments, the user employs the mobile device 102, stationary device 103 or other user devices 105 to access and/or download one or more tools from the services 120 to the device (102, 103) where the tools are employed to create and/or share the dynamic image.

According to some embodiments, the tools are provided in an application that the user downloads to the device. For example, the application can be downloaded from the application server 112. According to some embodiments, the application server 112 is hosted by a third party service, for example, in an application store or other digital application distribution platform from which other applications unrelated to the dynamic-image application can also be accessed and downloaded (well-known current examples include the iOS App Store operated by Apple, the Amazon App store and Google Play). According to other embodiments the application server 112 is provided by the entity that hosts the services and resources included in the services 120. Accordingly, in some embodiments the application server 112 is integrated into the services 120. In further embodiments, the system 100 allows updates to be dynamic-image application and other software to be "pushed" to any of the devices 102, 103 and 105 from either or both of the application server 112 and the services 120.

According to the illustrated embodiment, the user further employs the device to access additional resources to share dynamic images with other users of the service 120, for example, via social media resources included in the services 120 or provided by a third-party. For example, the social logic 126 can allow for the sharing of dynamic images via Facebook, Twitter, the provider of the host application and services 120 and/or other social networks. In a further embodiment, the services 120 and social logic 126 allow the dynamic images to be shared via a blog, for example, Tumblr.

According to some embodiments, the file sharing resources 122 generate a different file type with which to share depending on the manner and/or resources via which the dynamic image will be shared. In one example the animated image is stored in a video format such .mov format, .avi format, HTML5 format or any other video format including high definition video formats. In another example, the dynamic image is stored in a bitmap image format such as Graphics Interchange Format (GIF). Considerations used to determine the most appropriate file type include the communication network used to transmit the image and the type of device on which the dynamic image is rendered for viewing. In accordance with these embodiments, the selection of the dynamic-image format is optimized for the rapid distribution and viewing by users of the services 120 by, for example, generating the dynamic image in a file type that is optimized for the bandwidth of the network by which it is distributed and/or the processing capabilities of a device on which is viewed.

According to various embodiments, the file generation service 124 provides users with the resources, for example, applications that can be downloaded to the devices 102, 103. In some embodiments, the applications provide the tools and functionality that allow the user to create dynamic images using the mobile device 102 and stationary device 103.

According to some embodiments, the one or more databases 128 store user identification information (for example, user IDs and passwords), user content (for example, dynamic-images that are saved at the services 120), other information associated with the user such as their social network/contacts and/or other preferences. Depending on the embodiment, the database 128 can include any of a relational database, object-oriented database, unstructured database, or other database. Further, the database 128 can be included in any aspect of a memory system, such as in RAM, ROM or disc, and may also be separately stored on one or more dedicated data servers included in the services 120.

Figure 2:
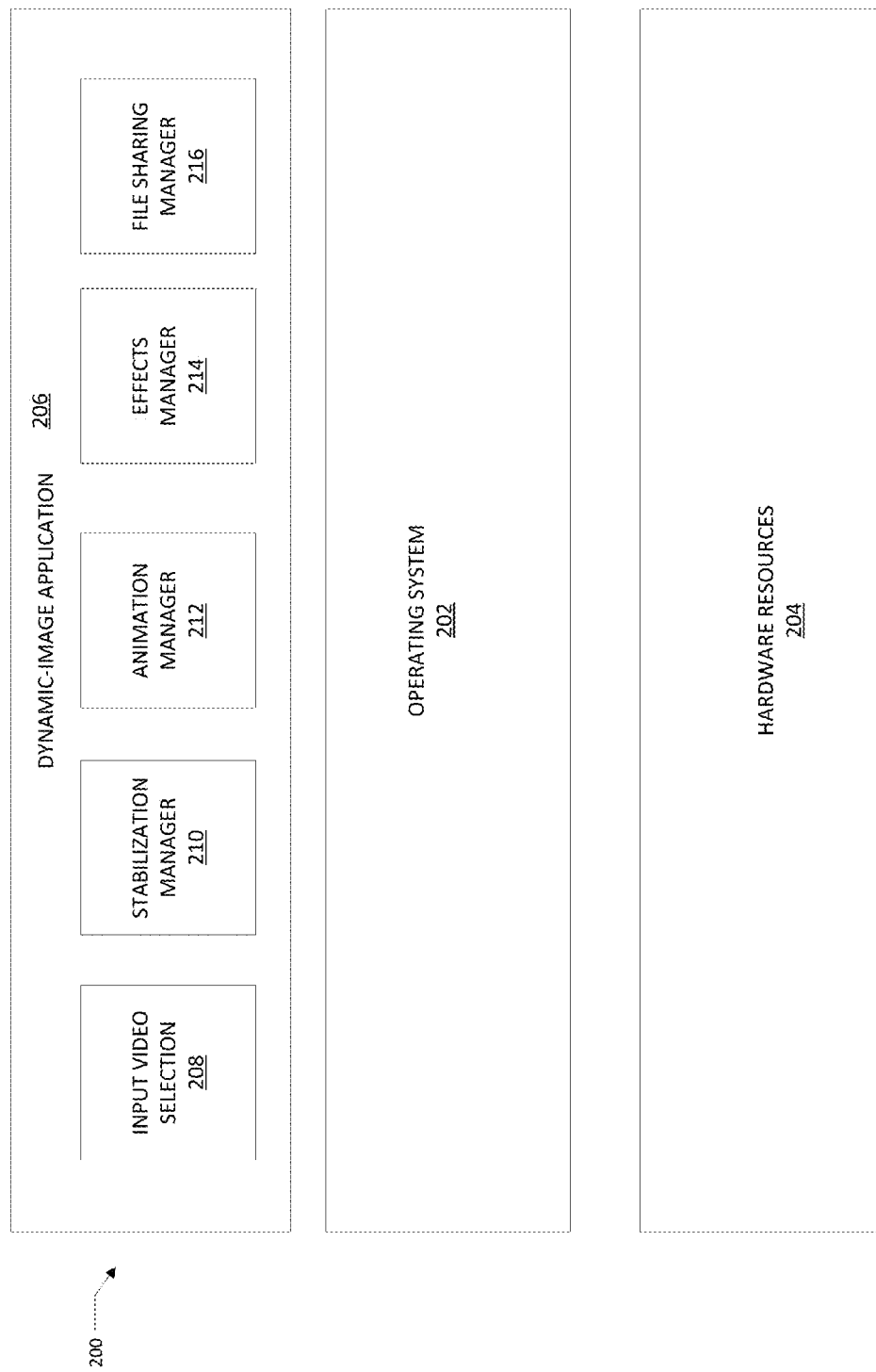
FIG. 2 illustrates a hierarchy for a device in accordance with one embodiment.

FIG. 2 illustrates a hierarchy 200 for dynamic image creation and sharing in accordance with various embodiments. In the illustrated embodiment, the hierarchy 200 includes an operating system 202, hardware resources 204 and a dynamic-image application 206. In general, the dynamic-image application 206 is implemented in accordance with an application programming interface (API) to communicate via the operating system to the various hardware resources and user interfaces available with the device 102. According to various embodiments, the APIs can be a set of APIs that are usually included with operating systems (for example, Linux or UNIX APIs), as well as APIs specific for sending and receiving data via I/O devices such as the display in which a GUI is presented to the user for use in creating and sharing dynamic images.

As will be apparent to one of ordinary skill in the art in view of the disclosure herein, the dynamic-image application 206 can be configured for operation with a variety of operating systems 202 and associated hardware resources 204. For example, the dynamic-image application 206 can be configured for operation with Apple iOS, Google's Android, RIM's BlackBerry OS and Microsoft Windows Phone. The preceding provide some examples and the dynamic-image application 206 can be configured for operation with other operating systems.

Operating system 202 provides an interface to the hardware resources 204 for example the display employed to render a GUI for operation of the dynamic-image application 206. Accordingly, the operating system 202 can support a variety of displays including touch displays and other user interfaces. According to further embodiment, the operating system 202 can also communicate with other hardware such as communication interfaces (e.g., a cell phone), cameras, audio hardware, location systems such as GPS and other I/O devices using device drivers. The operating system 202 can also communicate with hardware processing modules such as the graphics processing unit and/or the central processor executing operations and/or instructions during the dynamic-image creation process.

Dynamic-image application 206 can be a dynamic-image application executing on a device such as the mobile devices 102 and stationary device 103. Dynamic-image application 206 can include an input video selection module 208, a stabilization manager 210, an animation manager 212, an effects manager 214 and a file sharing manager 216. These components can be communicatively coupled to one or more of each other. Though the components identified above are described as being separate or distinct, two or more of the components may be combined in a single process or routine. The functional description provided herein includes the separation of responsibility for distinct functions as an example. Other groupings or other divisions of functional responsibilities can be made as necessary or in accordance with design preferences. For example, in one embodiment, the functionality provided by the stabilization manager 210 and the animation manager 212 can be combined in a single process.

According to various embodiments, the input video selection module 208 is employed by a user to acquire a stream of images for use in creating a dynamic-image. According to one embodiment, the input video selection module 208 can also be used to present display objects, for example, the display objects 106 and 108, or other objects employed by the user to select one or more images used to create a dynamic-image. For example, as touch inputs are received, the input video selection module 208 can modify the display objects or images presented to the user in the display 104. Depending on the embodiment, the input video selection module 208 is employed to either record a stream of images, retrieve a stream of images stored in the memory of the device 102, 103 and/or retrieve a stream of images from a remote location in the cloud. The functionality of the input video selection module 208 is described in further detail herein.

According to some embodiments, stabilization manager 210 receives a series of images selected by user using the input video selection module 208. The stabilization process is described in further detail herein. However, in general, the stabilization manager 210 operates to process the selected images to compensate for any undesired motion of the camera that may have occurred during the recording of the stream of images. In accordance with one embodiment, the stabilization manager 210 automatically operates in the background without user input to stabilize the selected images recorded with the device 102, 103. In accordance with another embodiment, the stabilization manager 210 employs a touch input received from the user to determine a type of stabilization required or whether stabilization is necessary at all.

According to various embodiments, the animation manager 212 presents the at least one image from the stream of images in the display along with display objects that provide one or more tools or functionality to allow the user to select a region in the stream of images to include animation and modify their choice or choices for animation. According to one embodiment, the functionality provided by the animation manager 212 includes a masking function.

According to some further embodiments, the effects manager 214 receives the selected stream of images from the animation manager and presents the selected stream in the display along with one or more tools, functionality and/or display objects to allow the user to playback, add features, filtering or other effects to customize the dynamic-image. For example, in one embodiment, the playback can include any of a playback speed, a playback direction and/or a looping feature. Accordingly, the effects manager can present icons or other display objects to receive a user's inputs to select the preceding options and save the stream of images with the corresponding effects selected by the user.

According to still further embodiments, the file sharing manager 216 receives one or more user inputs to define whether, and if so, how the stream of images is shared. According to some embodiments, user inputs can include a title, a tag (i.e., a description), selection of a geo-tag, and/or selection to share via one or more social media services. Accordingly the file sharing manager 216 can provide one or more display objects in the display 104 and received one or more touch inputs as the user's selections and preferences.

Figure 3:
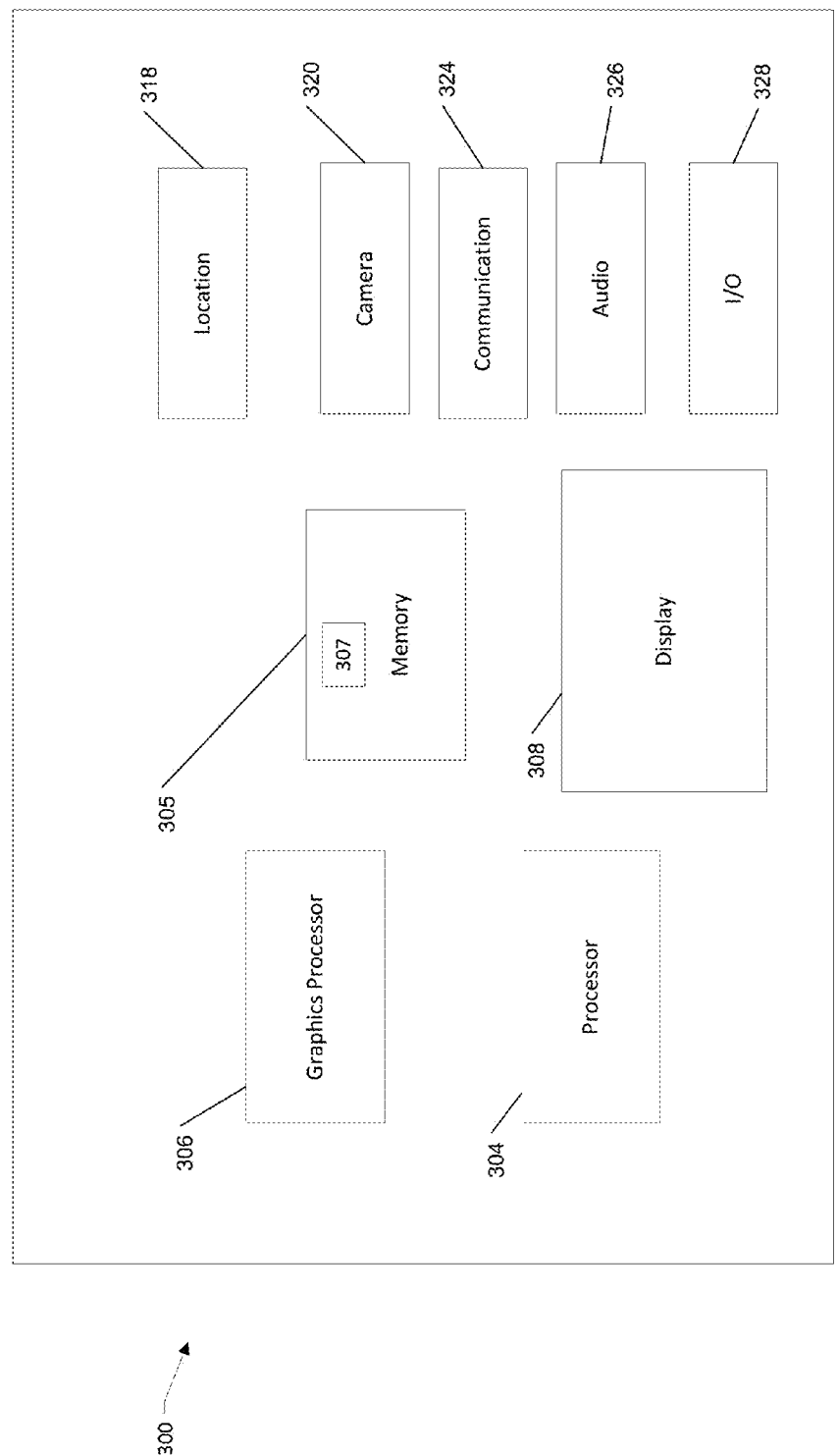
FIG. 3 illustrates a block diagram of a hardware architecture for a device in accordance with one embodiment.

FIG. 3 illustrates a block diagram of hardware architecture of a device 300 for use in dynamic-image generation in accordance with one embodiment. Depending on the embodiment, the hardware architecture illustrated in FIG. 3 can be included in the mobile device 102, the stationary device 103 or other user devices 105. In the illustrated embodiment, the device 300 includes a processor 304 (for example, a CPU), a memory 305, a graphics processor 306 (for example, a GPU) and a display 308. The memory 305 is configured to store software instructions 307 in accordance with various embodiments. Further, the device 300 includes a location and/or positioning device 318 (for example, a GPS to determine location information associated with the device 300), a camera 320 (for example, a video camera), communication systems 324 (for example, a cellular phone), audio systems 326 (for example, a microphone and/or speakers), and other peripheral and/or I/O devices 328. The I/O devices 328 can, for example, include a touchscreen controller suitable for use with a touchscreen display provided in the display 308, or alternatively, a trackpad used to move a cursor within a GUI. In embodiments in which the device 300 is a laptop or desktop computer, the I/O 328 can include a mouse used to move the cursor within the GUI. According to further embodiments, the audio system 326 can be employed with a speech recognition system to allow hands-free interaction with the GUI.

The components included in the device 300 can be coupled by one or more communication buses or signal lines. The communication buses can be used for the communication of instructions/commands and data between the illustrated components and between the illustrated components and other components included in the device depending on the embodiment.

The camera 320 can provide camera functions, such as recording photographs and video clips. According to various embodiments, the camera 320 records images and streams of images that are employed in generating a dynamic image. In some embodiments, the recorded streams of images are immediately included in a process of generating a dynamic image. In one embodiment, a frame buffer is used to temporarily store one or more images included in the stream of images. According to other embodiments, the recorded streams of images are first stored in the memory 305. According to some embodiments the camera 320 includes an optical sensor (for example, a CCD or a CMOS optical sensor).

In various embodiments, the communication system 324 can include one or more wireless communication subsystems and one or more wired communication subsystems. Wireless communication systems can include RF communication systems and/or optical communication systems such as IR communication systems. The RF communication systems can provide for local communication such as via Bluetooth™ communication and/or long-distance communication, for example, via cellular and/or satellite communication networks.

The device 300 can also support hardwired communication systems in some embodiments, for example, communication via USB or other hardwired communication port included in the device 300. Depending on the embodiment, the hardwired communication can allow the device 300 to communicate with any of a personal computer, a printer, a display screen, a router or other processing devices capable of receiving and/or transmitting voice or data.

In general, the device 300 is not limited to any specific communication hardware and/or protocol. Thus, for example, the communication systems can support any of a (GSM) network, a GPRS network, an enhanced data GSM environment (EDGE) network, 802.x communication networks (e.g., Wi-Fi, WiMax, or 3G networks), code division multiple access (CDMA) networks, a Bluetooth™ network, or other communication network depending on the embodiment.

One or more microphones can be included in the audio system 326 to, for example, provide audio recognition and/or recording. In one embodiment, the audio system 326 is employed in the communication system 324 to allow the device 302 to be employed as a phone. According to some embodiments, the audio system 326 is used in combination with the camera 320 to record sound associated with images recorded using the camera 320. As mentioned above, in some embodiments, the audio system 326 can be employed with a hands-free user interface such that the processes and user-operations described with reference to FIGS. 4-14 are accomplished hands-free.

According to further embodiments, the audio system 326 includes speakers employed to playback recorded audio and/or video files, such as MP3, AAC, and MPEG files. In further embodiments, device 300 can include the functionality of an MP3 or other audio player.

According to one embodiment, the display 308 includes a touchscreen that can detect contact and movement or break thereof using any of a number of touch sensitivity technologies, including but not limited to capacitive, resistive, infrared, and surface acoustic wave technologies, as well as other proximity sensor arrays or other elements for determining one or more points of contact with display 308 or proximity to the display. According to one embodiment, display 308 can be used to implement virtual or soft buttons and/or a keyboard or other display objects 106, 108.

According to various embodiments, the I/O devices 328 can include one or more buttons, rocker switches, thumbwheel, infrared port, USB port, and/or a pointer device such as a stylus. For example, the one or more buttons can be employed for volume control of a speaker and/or microphone included in the audio system 326.

In various embodiments, the memory 305 can include high-speed random access memory and/or non-volatile memory, such as RAM, EEPROM, flash memory magnetic storage devices and optical storage devices. In further embodiments, the memory 305 can store operating system such as, LINUX, UNIX, OS X, iOS, Android, bada, BlackBerry OS, Symbian OS, WINDOWS, WINDOWS phone for mobile, S40 (Series40) or any other other OS operating on a mobile device or a stationary device. The operating system can include instructions for handling basic system services and for performing hardware dependent tasks. As mentioned above, the dynamic-image application can be configured for a specific operating system in a selected embodiment.

In various embodiments, the memory 305 can also store communication instructions to facilitate communicating with one or more additional devices, one or more computers and/or one or more servers, for example, as described with reference to FIG. 1. In some embodiments, the memory includes instructions for rendering the graphical user interface in the display 104, for example, where the graphical user interface can be employed by the user to create and share dynamic images. According to these embodiments a variety of additional instructions can be included in the memory 305. For example, software instruction 307 can be provided for a variety of web browsing, media processing, telecommunications, camera and video related functions and GPS-enabled operations as some examples in addition to software instructions specifically related to the dynamic-image functions.

Depending on the embodiment, the software instructions 307 can be implemented as individual software programs or modules, or combined with one another in various configurations. Also depending on the embodiment, various functions of device 300 can be implemented in hardware and/or in software, including in one or more signal processing and/or application specific integrated circuits.

The hierarchy illustrated in FIG. 2 and the device architecture illustrated in FIG. 3 provide examples in accordance with some embodiments. However, the hierarchy 200 can include more or different software elements and/or modules alone or in combination with those illustrated and described with reference to FIG. 2. Also, the device 300 can include more or different hardware elements and/or modules alone or in combination with those illustrated and described with reference to FIG. 3.

Figure 4:
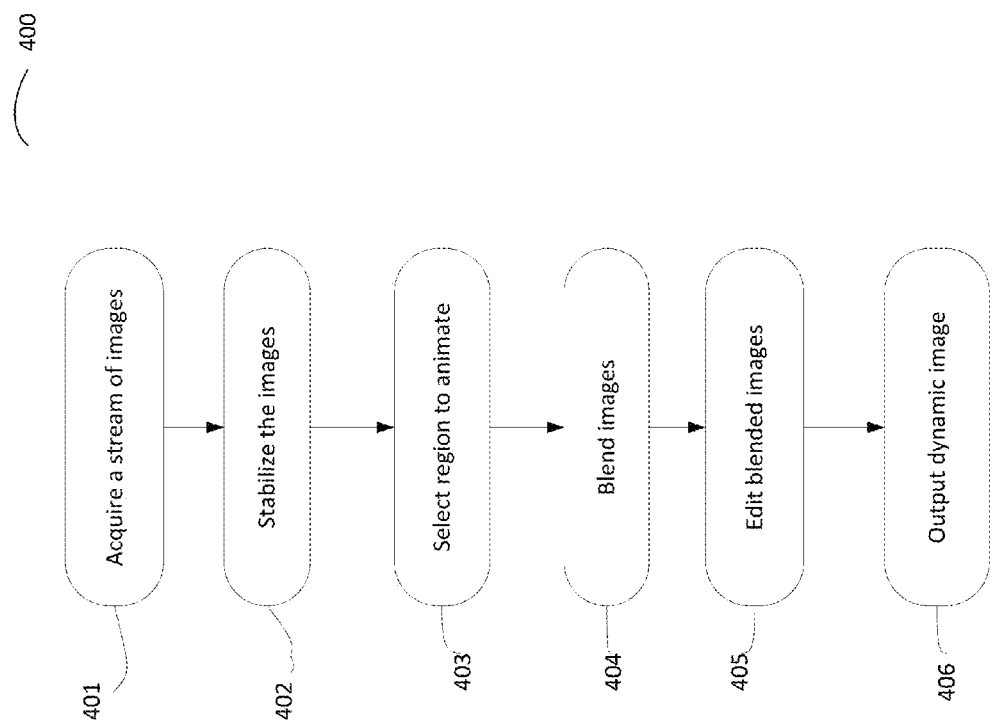
FIG. 4 illustrates a flow diagram of a process for creating a dynamic image in accordance with one embodiment.

FIG. 4 illustrates a flow chart for a process of creating dynamic images. According to some embodiments, the application 206 is stored in memory 305 of the device 300 and includes instructions for acquiring a stream of images and creating a dynamic image from the stream of images. The device 300 may be a portable device such as a phone, a smart phone, a tablet, a camera or a portable computer or any other form of mobile or stationary processing device. The process may be implemented as a set of executable instructions on a computer readable medium.

At act 401, a stream of images is acquired. The stream of images is stabilized at act 402. A region is selected in at least one of the images from the stream of images at act 403. An image is animated according to the selected region at act 404. The animated image is edited at act 405. At act 406, the animated image is output. In some embodiments, the animated image is output for display on the processing device and/or sent through a network for storage, further processing and/or display on remote processing resources (e.g. a server, remote mobile devices, etc). In some embodiments, the animated image is a hybrid between a static image and moving image. In other embodiments, the animated image is a very short, looping video sharable and displayable on a plurality of platforms (e.g. smart phones, social media platforms, blog platforms, etc.).

At act 401, a stream of images is acquired by the user using the application. In accordance with one embodiment, the user is provided with a choice of recording a stream of images using the camera 320 or acquiring a previously recorded stream of images, for example, the stream of images stored in the memory 305. In some embodiments, the camera 320 is included in the portable device and includes one or more lenses. The user can select one of these lenses to record the stream of images. The user can also select the orientation of the lens and may be able to use a zoom associated with the selected lens. The application allows a user to have complete control of the camera and provides the user with access to all the features of the camera as if the user was directly manipulating the camera located in the portable device, for example, where the portable device is a smart phone and the camera is located within the phone casing. In another example, the portable device is a tablet computer, a laptop or any other computing device including a built-in camera. In a third example, the camera is external to the computing device and connected through a communication interface to the computing device. The communication interface can either be a wired interface or a wireless interface depending on the embodiment.

In another example, the user may select a stream of images that was previously recorded with the portable device's camera or with any other external camera or video recording device. The previously recorded stream of images may be stored locally on the portable device, for example, in the memory 305, or can be stored in a remote location and accessible through a local or wide area network depending on the embodiment. The stream of images can be a video stream with a frame rate corresponding to one of standard video frame rates such as 24$p$, 25$p$ 30$p$ or 60$i$ etc. In other examples, the stream of images can be a stream of computer generated images or a plurality of video and/or graphics images with frame rates not corresponding to a particular standard frame rate. In another example, the user may select a plurality of single static photos or images one at a time to generate a stream of images.

In accordance with one embodiment, once the stream of images is acquired, the application may request from the user a selection of a subset of images from the stream. In accordance with a further embodiment, the selected subset of images is used in later acts of the process for generating a dynamic image. In one example, the application requests that the user reduce the length of the stream of images by dropping one or more of the images included in the stream of images. The application can also present the user with the entire stream and brackets for selecting a start point and an endpoint in the stream. According to one embodiment, a portion of the stream is selected by the user and/or constrained by the application to a maximum length to conform to characteristics determined by the application. In another example, the application can automatically select a subset of images from the acquired stream. For example, the selection of the subset of images can be completed according to a maximum allowable display time or other constraint. In various embodiments, the selected subset of images may correspond to a video stream of 2 seconds, 3 seconds or N seconds.

Once the stream is acquired, the application stores it in the memory 305. In accordance with one embodiment, the application running on a portable device acquires the stream of images by reading data from a buffer dedicated to receiving raw images when being captured by the portable device's camera. According to this embodiment, the application transfers the stream of images from the raw buffer into a second buffer for further processing.

In various embodiments, the process 400 can include acts that differ from those illustrated. For example, additional or fewer acts can be included in the process 400 depending on the embodiment. In further embodiments, acts can be performed in a different order than those illustrated. As one example, act 402 can be performed following act 403 according to one embodiment. In another example, act 405 can be performed prior to act 404.

Figure 5:
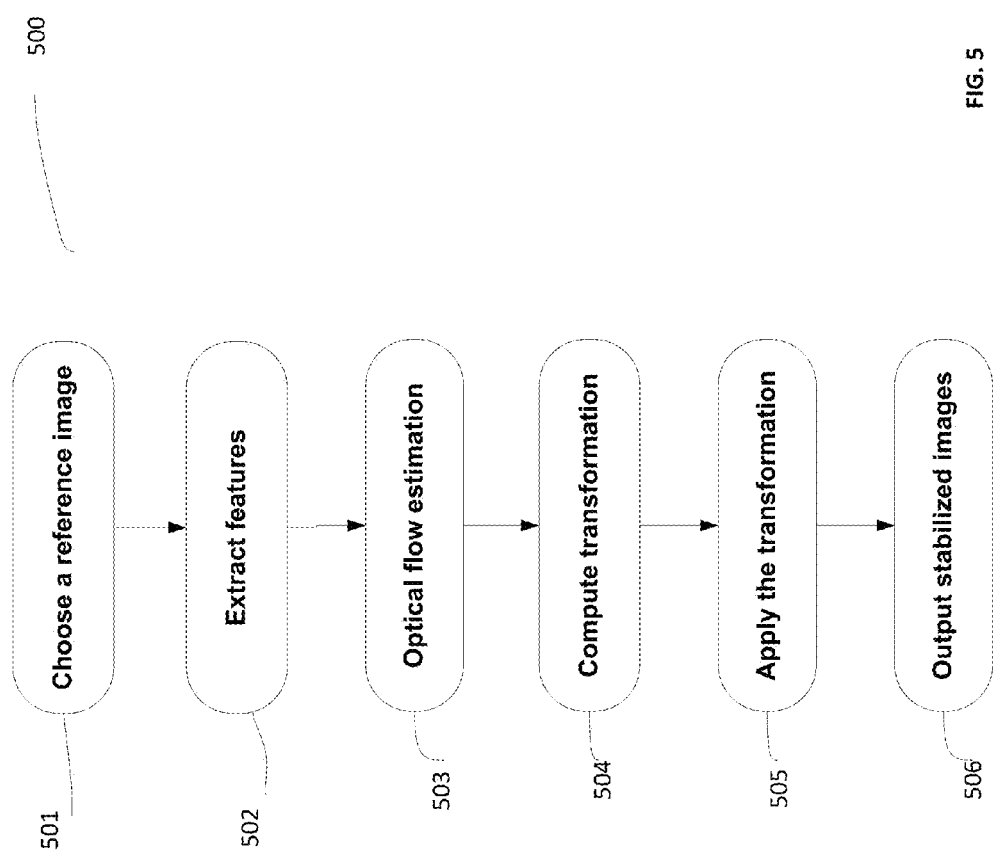
FIG. 5 illustrates a flow diagram of a process for stabilizing a stream of images in accordance with one embodiment.

Referring now to FIG. 5, a process 500 for stabilizing the stream of images (for example, the act 402) is described in more detail in accordance with an embodiment. In one embodiment, the application automatically begins the process 500 after the stream of images has been acquired and selected by the user. In various embodiments, the stabilization process compensates for undesired motion of the camera that occurs during the recording of the stream of images. The stream of images output from the process 500 may be referred to as the stabilized stream. The stabilization process results in the stabilized stream of images appearing substantially smoother than the stream of images otherwise would. According to one embodiment, the result that is achieved is a professional quality that would otherwise have required special professional camera equipment to achieve the same result. In one example, the stabilization process is used to remove any undesired movement of the camera due to hand shaking caused by the user when recording the stream of images with a handheld device such as a smart phone, tablet, a camera etc.

In some embodiments, the act 402 and any associated stabilization process (for example, the process 500) may not be necessary. According to one embodiment, the user is given an opportunity to disable this act. In another example, the process 500 is performed automatically by the application 200 without any user input required to initiate the process. In a further embodiment, the process 500 is initiated as soon as the user has finished acquiring the stream of images. In this embodiment, the user may not even be aware that the process 500 was performed. According to another embodiment, the process 500 is started automatically by the application while the user is recording the stream of images. For example, the process 500 can be performed on a substantially real-time basis. According to these embodiments, the stabilization is performed in the background while the user is performing other tasks such as recording images, selecting a region to animate or selecting editing operations such as the application of a filter.

At act 501, a reference image is selected. In one embodiment, the reference image is selected automatically by the application. The reference image may be the first image of the stream. In another example, any one from the first to the $N^{th}$ image of the stream may be selected as the reference image. In another embodiment, the application 206 may request that the user select a reference image from the stream of images prior to stabilizing the stream.

At act 502 features are extracted from each image of the stream of images. In some embodiments, the features are geometric features such as corners of objects, centers of objects or edges in the image. In general, the extracted features may be any of points, lines or curves. The features may be tracked from an image to another of the images in the stream of images in order to determine the movement of the camera. In accordance with one embodiment, a feature extraction algorithm is used to detect features in an image such as edge detection algorithm. For example, the application may be configured to use one or more predefined function of a computer vision library such as OpenCV, VXL or other computer vision libraries compatible with the device's software and hardware resources. In one example, a Shi-Tomasi corner detection algorithm is used to extract corners in an image. Referring to FIG. 6, an image 621 from a stream of images is illustrated where the image includes a plurality of extracted feature points 622. In one embodiment, the extracted features 622 are located at various locations in the image 621. The quantity of feature points included in the plurality of feature points 622 extracted can vary depending upon the embodiment and is not limited to the number of feature points illustrated in the image 621. In various embodiments, the plurality of feature points 622 includes tens or hundreds of features points that are extracted from the image. In some embodiments, the quantity of feature points is determined according to the complexity of the image where a greater quantity of feature points 622 are extracted for images having greater complexity.

At act 503, an optical flow estimation is performed for each image of the stream with respect to the reference image. Depending on the embodiment, one or more of a plurality of different optical flow estimation techniques may be employed at act 503. According to one embodiment, a Lucas-Kanade algorithm is used. According to this embodiment, the iterative Lucas-Kanade method with pyramids is applied on the extracted features and determines for each feature in an image a corresponding displacement vector. In some embodiments, the application may be configured to use one or more predefined function of a computer vision library such as OpenCV, VXL or other computer vision libraries compatible with the device's software and hardware resources to perform the flow optical estimation. The displacement vector is representative of the movement of the feature in the image with respect to its position in the reference image. At act 503, for each extracted feature in an image from the stream of images, a corresponding displacement vector representative of the movement of this point is determined with respect to feature points in the reference image.

As illustrated in FIG. 7, the reference image 731 includes a plurality of feature points extracted such as feature points 732 and 733. The image stream also includes an image 741 from which a plurality of feature points are also extracted. In the illustrated embodiment, the image 741 includes feature points 742 and 743. In FIG. 7, the feature point 742 corresponds to feature point 732 which is displaced in image 741 relative to the location of the feature point 732 in the reference image 731. In the illustrated embodiment, a vector 744 represents a displacement of the feature point 742 relative to its corresponding 732 and the reference image 731. Similarly, feature point 743 corresponds to a displaced feature point 733. The act of optical flow estimation includes an act of finding, for each one the extracted features from the image 741, a corresponding displacement vector representing the displacement of the feature point with respect to its corresponding feature point in the reference image 731. In some embodiments, each feature point in the image 741 has a different associated displacement vector. For example, the feature point 742 and the feature point 743 may have distinct associated displacement vectors. According to other embodiments, at least some of the feature points in the image have identical displacement vectors.

Once the displacement vectors have been computed for all features extracted in the image, a transformation is computed based on the displacement vectors at act 504. According to one embodiment, the transformation may be referred to as a homography matrix. Finally the transformation is applied on the corresponding image to compensate for the undesired movement or motion of the camera at act 505. In one embodiment, the transformation represents a perspective warp applied on the image to adjust for the deformation caused by camera movement.

According to one embodiment, the act 402 of applying a stabilization process is performed on the entire image with respect to a reference image. According to another embodiment, the stabilization process such as the process 500 may be performed on a portion of each image from the stream with respect to a portion from the reference image. For example, the process 500 may be performed after a region is determined and only a portion of the image is stabilized instead of the entire image because only the portion of the image will be kept moving and the remainder of the image will become static.

In accordance with one embodiment, the act of stabilization is performed with instructions executed at least in part on the central processing unit of the processing device 300. In some embodiments, at least some steps of the stabilization act are performed in the graphics processing unit. For example, the act of applying a transformation on an image may be performed in the graphics processing unit of the device 300 for optimized processing.

At act 506, a stream of stabilized images is output and stored back in memory 305. According to some embodiments, the stream of stabilized images is retrieved from memory for further processing, for example, as illustrated at acts 403-406 of the FIG. 4.

Figure 8:
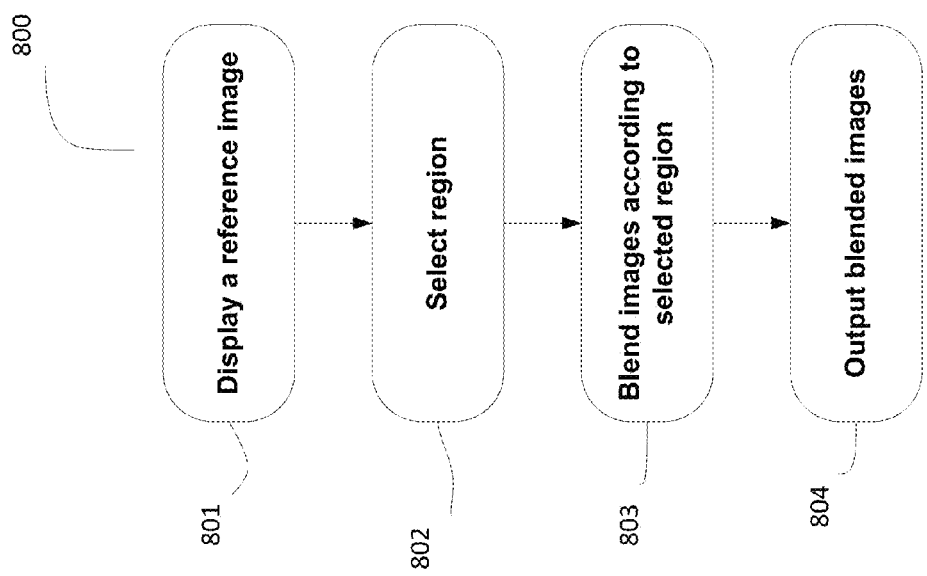
FIG. 8 illustrates a flow diagram of a process for blending images in accordance with one embodiment.

Referring now to FIG. 8, a process 800 for determining a region to animate and creating a dynamic image based on the selection are described in more detail. At act 801, according to one embodiment, the application displays a reference image from which to select a portion to animate. In various embodiments, the reference image may be automatically selected by the application 206 or it may be selected by the user from the plurality of stabilized images. The reference image may be displayed on a display included in the processing device 102, 103 such as a portable device (phone, tablet, camera etc) or it may be displayed on another display monitor or screen connected to the computing device through a communication interface. Each of the preceding embodiments can include a device having a touch screen.

Figure 9C:
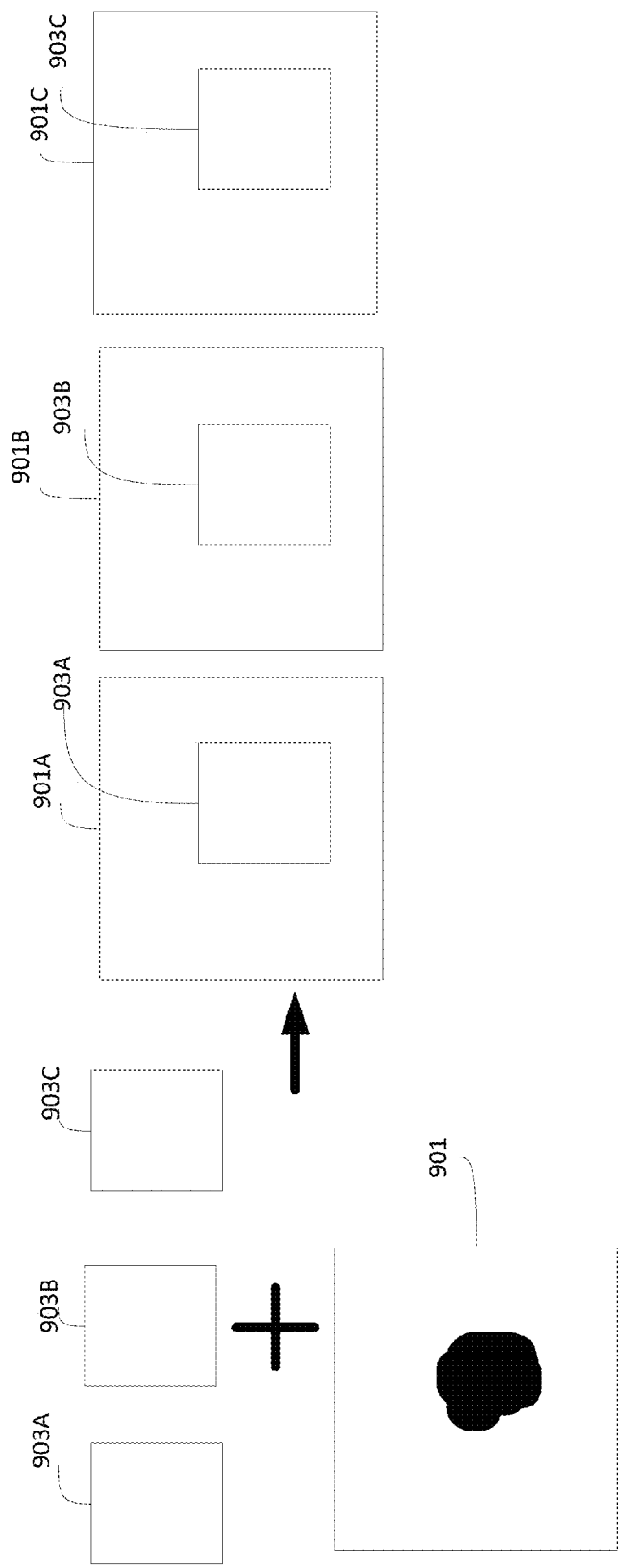
FIG. 9C illustrates a block diagram of blended images in accordance with one embodiment.

The process 800 is described with reference to FIGS. 9A-9C. FIG. 9A includes an image 901 and a region 902. FIG. 9B includes the image 901, the region 902 and a bounding box 903. FIG. 9C includes a plurality of images 901A-901C and a plurality of regions 903A-903C.

At act 802, a user selects a region from the image that he would like to animate. As illustrated in FIG. 5A, the user selects a region 502 of the image 501 that needs to be animated. For example, the user may touch the screen of the portable device to select a region (for example, select the region using a finger swipe). In one example, the user may be able to zoom into the reference image to define the region with high precision. In some embodiments, the user may be provided with a drawing tool such as a paintbrush of various sizes for determining the region. In other examples, the user may use other I/O devices to select the region, such as a mouse, a pen or any other I/O device for selecting a region in a reference image. The selected region may be of any shape and is determined by the user.

In one example, the selected region is the only region that is kept dynamic and all the rest of the reference image is static. In another example, the selected region may comprise an object for which movement should be tracked and included in the final dynamic image. In this example, the selected region is not the only portion of the reference image that includes animation. According to one embodiment, the selected region is used as a seed region to determine the final region to animate in the reference image. For example, if a user would like to retain a car's movement in the dynamic image, he can select the car at its current location in the reference image; the application 206 then tracks the movement of the car in all succeeding images to create a dynamic image including the moving car.

The region selected at act 802 defines a mask which will be used during the blending act 803. In some embodiments, once the user has selected a region 902, the application defines a bounding box 903 comprising the selected region 902 as illustrated in FIG. 9B. The box 903 is used to limit the size of portions from the stream of images which will be used in the following processing acts instead of the initial entire images. In one example, the bounding box can be the smallest rectangle comprising the selected region.

In an alternative embodiment, the selection act may be performed before the acts of acquiring and stabilizing the images. For example, an image representing a mask may be acquired and used during the act of blending the images. In another example, a user may draw a mask on a screen prior to acquiring the stream of images.

At act 803, each image of the stream is blended with the reference image according to the mask.

Referring to FIG. 9C, in one embodiment, a region corresponding to the bounding box 903 is extracted from each image of the stream of images resulting in a plurality of regions of images 903A, 903B, and 903C. Each one of the plurality of regions 903A-C is blended with the reference image 901 in accordance with the mask resulting in a plurality of blended images 901A, 901B, and 901C. The application may configure the graphics processing unit of the computing device to perform the blending. The use of the regions 903A-C during the blending instead of the entire images from which they are extracted accelerates the acts of blending and more generally accelerates the dynamic image creation process. In some embodiments, the mask has associated transparency levels that may vary from a location to another, for example, the mask may be more transparent near its edges to provide for improved blending and smooth transition between an image and the reference image with which it is blended.

In another embodiment, the blending of a reference image with portions of images from the stream of images is done without extracting the region in a first act. In this embodiment, the graphics processing unit may be configured to blend a portion of a first image with the reference according to the selected mask without extracting the region and storing it to memory.

In another embodiment, the application may configure the central processing unit (for example, the processor 304) for blending the images.

At act 804, blended images are output and stored in memory. Once the images have been blended, the new stream of images may be edited. In one example, a plurality of visual effects and filters may be applied on the stream of blended images. In another example, other editing operations may be performed on the new stream of images alone or in addition to the filters and visual effects. Examples of some visual effects that can be applied to the new stream of images include having the stream of images play in a forward direction, play in a reverse direction and/or play in a continuous loop. Some effects may include varying the color balance and/or hue in the stream of images. In some embodiments, editing operations may be performed on a reference image, and on portions of other images from the acquired stream of images. In these embodiments, a blending act may be performed following the editing act 405 to blend an edited reference image with edited portions of other images.

Figure 10:
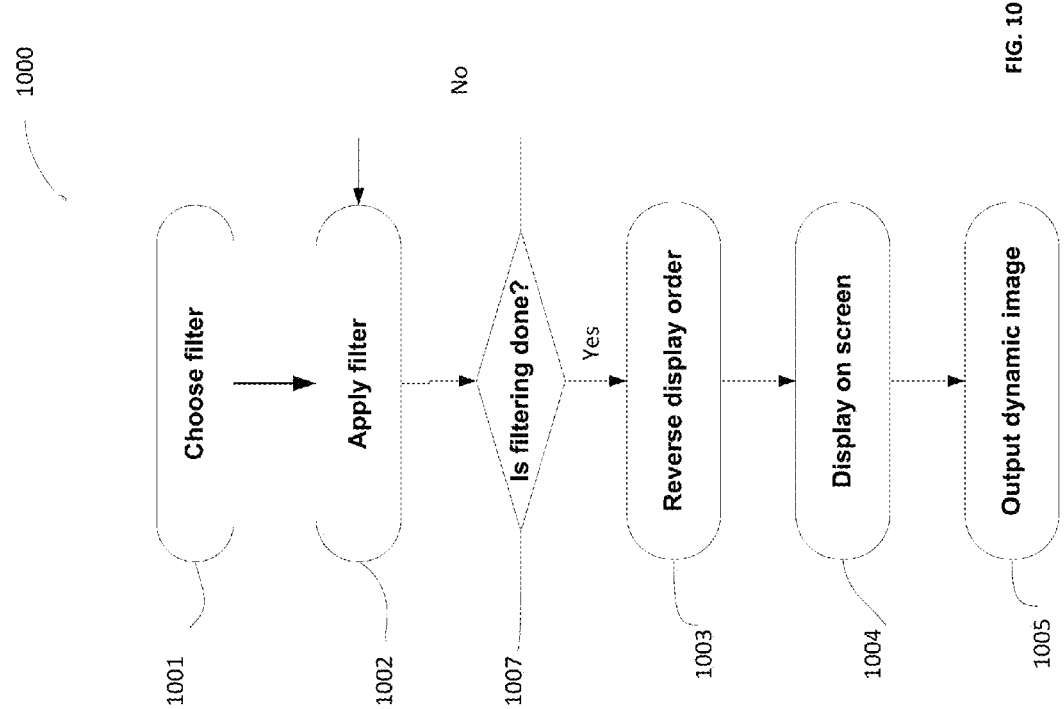
FIG. 10 illustrates a flow diagram of a process for creating dynamic images in accordance with another embodiment.

Referring now to FIG. 10, a process 1000 for filtering and editing the animated stream of images is described in accordance with one embodiment of the invention. In various embodiments, the application 206 provides the user with a plurality of filters and effects to apply on the animated images. Examples of filters that may be applied are red scale, cross-processing, video toaster etc. Other examples of effects applied on the animated images are cinematographic effects such as slow-motion, time lapse, stop motion, ghost effect, etc.

At act 1001, the user may select a desired filter from a set of filters. In response to receiving the choice, the application applies the selected filter on each image of the blended images. The filter can be applied to the entirety of the image to adjust the color balance and/or modified hue of the image. In some embodiments, the user may select instead or in addition to the filter another type of effects. In one embodiment, the application configures the graphics processing unit of the device 102, 103 to process the blended images according to the selected filter. In another embodiment, the application 206 configures the CPU to process the blended images according to the selected filter.

In some embodiments, the application 206 may allow a user to select more than one filter to apply to the blended images. In one example, the user may select to apply a first filter to a first portion of images from the stream of blended images and a second filter to a second portion of images from the stream of blended images. For example if the stream of blended images includes 10 frames, a first filter or effect may be applied on the first 5 frames of the stream and a different filter or effect may be applied on the last 5 frames. In another example, both a first filter and a second filter are applied on the entire stream of blended images.

According to some embodiments, the act of filtering is optional. Thus, in some embodiments, the act of filtering can be skipped during the creation of the dynamic image.

According to this embodiment, the dynamic image is created and displayed as a raw animated image. In the illustrated embodiment, the process includes act 1007 in which it is determined whether the filtering is complete. The process returns to act 1002 when the filtering is incomplete and moves to act 1003 when the filtering is complete.

At act 1003, the application allows the user to alter the display order and/or speed of the blended images. For example the user may choose to display the stream of images in the recorded order followed with the same stream of images in the reversed order in a loop. In another example, the user may choose to randomize the order of display of the images. In this example, the application may apply a randomization algorithm to display the images of the stream is an order different from the recording order. In another example, the display order of the blended images remains the same as the recording order of the original stream of images as acquired. In yet another example, the display order of the blended images may be reversed. Further, the user may choose to speed up the display of the stream of images by selecting the display rate. According to this choice, the application will adjust parameters of the processed stream of images such that the process stream is output displayed at the rate selected by the user.

At act 1004, the dynamic image is created and displayed on the screen of the computing device as an infinitely looping stream of images. The animated image may be stored using a plurality of formats. In one example the animated image is stored in a video format such .mov, .avi formats, HTML5 video format, or any other suitable video format. In another example, the dynamic image is stored in a bitmap image format such as Graphics Interchange Format (GIF).

At act 1005, the dynamic image is output. In some embodiments, the dynamic image is stored as a video file that may be compressed and output from the processing device through a network to a remote computing resource such as a server (for example, the resources 120). At the remote location, remote resources of the application are executed to convert the video file into a plurality of image and video formats. For example, the dynamic image may be converted into another video format, a HTML5 video element, and/or a bitmap image format such as GIF. Further a thumbnail representing the dynamic image can be created for use by the application. In various embodiments, the resulting dynamic image can be displayed on a webpage, shared on a social network, stored on the computing device locally or sent via email or SMS. The dynamic image may be shared on a social network of the application or it may be shared via external social networks. According to an action desired and selected by the user the application may share, distribute and/or display the dynamic image in a format more suitable to the selected action.

In accordance with some embodiments, the processes described in FIG. 4-10 are implemented on a graphical user interface allowing a user to create a dynamic image in substantially real time with a reduced number of interactions. In general, a user may use the graphical user interface to acquire a stream of images in a first act. In accordance with various embodiments, the GUI can be displayed in a touchscreen of a portable device such as a smart phone, a tablet, an MP3 player etc. In a second act the user may select a region from a reference image displayed in the display of the device 102, 103. In a third act, the user may select at least one editing operation to perform on the acquired stream of images. Finally a dynamic image (animated image) is displayed on the device's display and the user may select an action from a plurality of possible actions. For example, the user may delete the dynamic image; the user may store the dynamic image in an album or camera roll on the device. The user may send it via email or text message to a friend. The user may share the dynamic image on the social network of the application or on any other social network, or post it on a webpage or a blog.

In various embodiments, the mobile device 102 and the stationary device 103 can implement one or more of a variety of operations associated with the creation and/or sharing of dynamic images. According to some embodiments, the devices 102, 103 can present a graphical user interfaces in a display, for example, in the display 104. According to these embodiments, the device responds to inputs received from a user, for example, through the touch-sensitive display. For example, a user can select various operations by launching one or more applications on the device by selecting one of the display objects presented in the display 104. According to alternate embodiments, the user can select operations in other ways including, for example, using one of user-selectable menus included in the user interface. Once an application has been selected, one or more windows or pages corresponding to the application can be displayed on the display 104 of the mobile device 102 or the stationary device 103, for example, via a graphical user interface presented in the display. In embodiments where a touch display is employed, the user can navigate through the windows or pages by selecting appropriate places on the display 104. In other embodiments, the user can navigate through the windows or pages using a cursor rendered in the graphical user interface, for example, the cursor can be positioned using a mouse, touchpad or other input device. In further embodiments, the application can be accessed and navigated to create, view and/or share dynamic-images via voice commands where the device includes a speech recognition system.

Referring now to FIG. 11A to FIG. 14D, the display 104 is illustrated with the dynamic-image application launched on the device 102 in accordance with some embodiments. With the dynamic-image application operating, the user can use a touch-sensitive display and the computing resources of the device 102 to create and share dynamic images. Accordingly, the embodiments described with reference to FIG. 11A to FIG. 14D illustrate a series of display objects of a graphical user interface presented in the display to allow a user to interact with the dynamic-image application. According to these embodiments, the user selects the operation associated with an icon by providing an input in the region of the display where the icon is located, for example, a touch input when the display is touch-sensitive. In general, the operations described with reference to FIGS. 11A to 14D are illustrated in an embodiment in which the devices 102, 103 include an integral camera and/or memory for image storage. For example, the camera functionality can be made available by the application to the user to record the stream of images employed in creating the dynamic image. Regardless of whether the device includes a camera, the creation of the dynamic image can alternatively use a stream of images already stored in the memory 305 of the device. In various embodiments, the stream of images stored in the memory may have been either received/accessed by the device 102, 103 from another source (for example, e-mail, cloud storage, etc.) or recorded with the device and stored to memory 305.

In FIG. 11A, a graphical user interface 1110 is illustrated as rendered in the display 104. In the illustrated embodiment, the graphical user interface 1110 provides a main menu 1112, a first displayed image 1114 and a second displayed image 1115, for example, dynamic images. In the illustrated embodiment, the main menu 1112 includes a first display object 1120, a second display object 1122, a third display object 1124, a fourth display object 1126 and a fifth display object 1128. The graphical user interface 1110 also includes a menu bar 1132 in which a sixth display object 1130 and a seventh display object 1131 are presented. In various embodiments other display objects are presented in the graphical user interface 1110, for example, an eighth display object 1140, a ninth display object 1142, a tenth display object 1144, an eleventh display object 1146, and a twelfth display object 1148. The graphical user interface 1110 illustrated in FIG. 11A includes the graphical user interface rendered in the display to allow the user to access the dynamic-image application, communicate and share with other members of the dynamic-image community, and also perform account management for an account associated with the dynamic-image application.

An overview of some of the functionality provided by and tools available with the dynamic-image application is illustrated and described with reference to a first menu selection selected using the main menu 1112. Specifically, FIG. 11A illustrates the graphical user interface 1110 when the fifth display object 1128 referred to as "you" is selected. In the illustrated embodiment, the fifth display object 1128 includes a feed of dynamic images posted and/or reposted by the user. Accordingly, where the users can scroll through the graphical user interface vertically (for example, in the form of a timeline) the first displayed image 1114 represents a dynamic image posted by the user a point in time more recent than the second displayed image 1115. In an alternate embodiment, the direction can be reversed such that the most recently posted dynamic image appears below dynamic images earlier in time and the user scrolls forward through the feed from the top to the bottom.

In some embodiments the menu bar 1132 includes reference to the subject of the feed that is displayed, here, the users own posts. In one embodiment, the fifth display object 1130 allows a user to invite friends to review the user's posts while the seventh display object 1131 allows the user to move to a settings section where the user can perform a plurality of operations and parameter settings. For example, in this section, a user can find friends, invite friends, configure sharing services (e.g. connecting to social networks accounts), etc. According to another embodiment, the seventh display object 1131 allows the user to search for dynamic images using one or more keywords.

In various embodiments, each dynamic image is associated with information of interest to the user who created and/or posted the dynamic image and/or of interest to other users who view the image. Where the display 1110 includes a feed, each dynamic image included in the feed has a set of information unique to it displayed adjacent to the image. For example, the ninth display object 1142 provides the number of likes by viewers of the dynamic image, the tenth display object 1144 provides a number of reposts of the dynamic image by viewers, and the eleventh display object 1146 provides the number of comments by viewers where each of the preceding refer to the image 1114. Other information and statistics can be provided in further embodiments to convey additional information and feedback provided by the viewing audience.

In the illustrated embodiment, a selection of the twelfth display object 1148 allows the user to share the dynamic image, for example, the first displayed image 1114. Wide variety of options can be available depending on the embodiment. For example, the image can be shared via social media networks and/or blogs such as Facebook, Twitter and Tumblr, via e-mail or via messaging services, for example, by iMessage. The twelfth display object 1148 and also allow for the flagging of selected image for review.

Each image in a feed can include the display objects 1142, 1144, 1146 and 1148 together or in combination with other display objects. In addition, each dynamic image can include information concerning the user who posted and/or created the image. Information can include a username, user location, photographs and/or other information the user elects to share with viewers. In the illustrated embodiment, the eighth display object 1140 provides a location for an image selected by the user, for example, a photograph of the user. Biographical information provided by the user can also be displayed with the eighth display object 1140.

Others of the display objects included in the main menu 1112 can provide additional feeds for dynamic images when selected. For example, the first display object 1120 (referred to as "friends") can provide a feed of the dynamic images posted and/or reposted by those in the user's circle of friends who also use the application. The second display object 1122 can provide access to a wider variety of dynamic images such as a feed directed to images that have a positive trend as evidenced by current activity in the form of likes by other users, a feed directed to images that may be inspiring to viewers and a more random feed of dynamic images posted by users. Each feed can include other display objects, for example, display objects that allow a keyword search for dynamic images having a particular content that are included in the feed.

In the illustrated embodiment, the third display object 1124 (referred to as "capture") opens the portion of the dynamic-image application used to create a dynamic image as described below with reference to FIGS. 11B-14D in accordance with various embodiments. The fourth display object 1126 (referred to as "activity") presents a further interface in which the user and the user's friend's likes and comments can be reviewed along with direct communications with other users, for example, with their friends. In accordance with one embodiment the activities display includes a menu bar with display objects referred to as "you", "friends" and "mailbox" to allow the user to select which of the preceding to review.

In addition, the fifth display object 1128 (referred to as "you") presents a further interface that allows the user to manage their account for the dynamic-image application. Examples of available functionality can include a review of dynamic images that they've created, a review of their likes, a friends interface that allows them to access friends via other social media network such as Facebook and Twitter, a search for friends via the user's contact list and a search for friends from among other users of the application. In addition to the preceding, the interface can allow the user to provide biographic information such as their name, a selected photograph and a text description. The interface can also allow for the user to log out from the dynamic-image application or to connect with various services such as social media networks and/or blogs. In further embodiments, the interface can provide access to the terms of service, privacy policy and a rating system for the dynamic-image application.

The above description concerning FIG. 11A is provided in accordance with selected embodiments, however, it will be apparent to those of skill in the art in view of the disclosure provided here that the same or different features and functionalities can be included and/or accessed through the dynamic-image application via other windows depending on the embodiment.

In FIG. 11B, a graphical user interface 1100 is illustrated as rendered in the display 104. In the illustrated embodiment, the graphical user interface 1100 includes an image 1101 included in a stream of images, a menu bar 1102 including a first display object 1104A, a second display object 1104B and a third display object 1104C. In addition, the graphical user interface 1100 can include other display objects such as a fourth display object 1105A and a fifth display object 1105B. The graphical user interface 1100 illustrated in FIG. 11B includes the graphical user interface rendered in the display to allow the user to acquire a stream of images using the dynamic-image application. In one embodiment, the graphical user interface 1100 is displayed following a selection of the third display object 1124 illustrated in FIG. 11A. In various embodiments, the image acquisition can be performed by recording a stream of images or selecting a stream from a library of previously recorded videos. In the illustrated embodiment, the second display object 1104B provides an icon with which the user can select a start of recording and a completion of recording. The second display object 1104B can also include another element 1104D (for example, a timer) where for example a maximum recorded time of the stream of images is limited by the dynamic-image application. According to these embodiments, the timer limits the recording time to capture a stream of images to a maximum recorded time suitable for use with the application. In some embodiments, this limit can be set to 2 seconds, 3 seconds or more generally to N seconds. The third display object 1104C provides an icon with which the user can select a stream of images that were previously stored in the memory 305 of the device 102, 103. For example, the stream of images may be stored in a camera roll of the device or in a remote location accessible via a wired or wireless connection (e.g. cloud storage, a server included in the remote resources of the dynamic-image application). The first display object 1104A provides an icon with which the user can stop the recording process and go back to an initial page of the graphical user interface. In an alternative embodiment, the first display object 1104A may provide an icon with which the user can close the dynamic-image application.

The initial page of the graphical user interface is the first page displayed on the display and presented the user interacts with the application. In one embodiment, the graphical user interface 1100 as illustrated in FIG. 11A provides the initial page while in another embodiment the initial page may differ from the graphical user interface 1110. For example, the initial page can include other display objects for performing other actions, such as logging into an account, view a tutorial on the application, etc. Although the display objects 1104A, 1104B, 1104C and element 1104D are presented in the menu bar 1102 in the illustrated embodiment, the display objects need not be included in the menu bar. Further according to some embodiments, the menu bar 1102 is not included in the graphical user interface 1100.

Display objects associated with other features available with the device 102, 103 can also be presented in the graphical user interface 1100. For example, in the illustrated embodiment, the fourth display object 1105A provides the user with an icon that activates illumination of the subject being recorded using a light source included in the device 102, 103. Similarly, the display object 1105B provides the user with an icon that allows the selection of a camera direction, for example, to allow a selection of either a front-facing camera lens or a rear-facing camera lens.

Referring now to FIG. 11C, a stream of images 1107 selected by the user is presented in the graphical user interface 1100 in accordance with one embodiment. In the illustrated embodiment, the image 1107 is shown after the user has employed the second display object 1104B to start recording. At a later moment in time, the second display object 1104B is used to stop recording the stream of images. In some embodiments the graphical user interface illustrated in FIGS. 11A-11C allows the user to interact with embodiments of the image acquisition step 401 of the process 400 illustrated in FIG. 4.

Referring now to FIG. 12A, the graphical user interface 1100 includes an image 1201 included in a stream of images, a representation of the stream of images 1204, a selection tool 1206, a control button 1208 and a menu bar 1210. According to one embodiment, the dynamic image is created using a subset of images included in the stream of images 1204. Further, the graphical user interface 1100 as presented in FIG. 12A allows the user to select the subset of images using the display. According to the illustrated embodiment, the image 1201 corresponds to the first image located within the selection tool 1206. However, according to other embodiments, the image 1201 can be at another predetermined image location within the selection tool 1206. According to some embodiments, the representation of the stream of images 1204 includes a graphical representation of each frame included in a video.

In various embodiments, the selection tool 1206 allows the user to define a subset of images within the stream of images where the subset of images includes the individual images of the stream that is used to create the dynamic image. According to the illustrated embodiment, the selection tool 1206 includes a maximum width corresponding to a maximum time interval suitable for generating the dynamic image using the application. According to one embodiment, the selection tool 1206 is a fixed width. In this embodiment, a fixed number of images included in the stream of images are used to generate the dynamic image. According to an alternate embodiment, the selection tool 1206 provides a variable width such that the user can adjust the quantity of images between a start point (e.g., a first frame on the left end of the tool) and an endpoint (e.g., a last frame on the right end of the tool). In each of the preceding embodiments, the selection tool 1206 can be presented in a touch-sensitive display such that the user can move the selection tool 1206 by selecting the region of the graphical user interface 1100 where the tool 1206 is located and sliding it along the stream of images 1204. Further, where the selection tool 1206 includes movable endpoints, the tool 1206 can be presented in the touch-sensitive display since that the user can move a position each of the left and in the right end independent of one another. In a still further embodiment, the graphical user interface 1100 can allow the user to select images including images that are non-adjacent in the stream of images 1204 with which to build the stream of images used to generate the dynamic image.

In the illustrated embodiment, the control button 1208 corresponds to a playback button that the user can select to activate a preview of the stream of images selected by the user with the selection tool 1206. According to the illustrated embodiment, the operations available with the graphical user interface 1100 of FIG. 12A allow the user to play the stream of images selected using the selection tool 1206 and modify the selected images using the selection tool in the process of creating the dynamic image.

FIG. 12B illustrates the graphical user interface 1100 including an image 1202, the representation of the stream of images 1204, the selection tool 1206 and the menu bar 1210. In this embodiment, the image 1202 represents the stream of images selected by the user when being played back in the graphical user interface after the user has activated the playback button 1208. In the illustrated embodiment, the menu bar 1210 includes a first display object 1230 and a second display object 1231. According to this embodiment, the first display object 1230 can be selected by the user to cancel a video selection and or video editing process included in dynamic-image generation. In some embodiments, the first display object 1230 can be selected by the user to cancel a video selection and to move the process to a previous step of the dynamic-image application, for example, to the image acquisition step illustrated in FIG. 11B. Further, the second display object 1231 can be selected by the user to move to an immediately subsequent step of the dynamic-image generation operation.

Referring now to FIG. 13A, the graphical user interface 1100 includes a first menu bar 1302, a reference image 1303 selected from a stream of images, a region 1305, and a second menu bar 1310. In the illustrated embodiment, the first menu bar 1302 includes a first display object 1304A, a second display object 1304B, a third display object 1304C, a fourth display object 1304D and a fifth display object 1304E. In addition, the second menu bar 1310 includes a first display object 1330 and a second display object 1331 where selection of the first display object moves to the previous step in the dynamic-image generation process and selection of the second display object to the next step in the process. According to the embodiment illustrated in FIG. 13A, the graphical user interface 1100 allows the user to identify a region in the stream of images for animation where the animation is included in the dynamic image. Further, the user interacts with the touch-sensitive display to select the region to define a mask used in the blending process to provide the animation.

According to some embodiments, the region 1305 selected by the user defines the mask where the mask provides a geometric form (or shape) employed in the dynamic-image application to determine an animated region included in the dynamic image. In various embodiments, the mask can also include other features that affect the blending in which the mask is used. For example, the mask can be associated with a transparency level that defines the amount of each of multiple images employed in the blending process. According to this example, the mask may provide an associated percentage of each of multiple images that are blended together. According to further embodiments, transparency levels defined by the mask may very within the region 1305, for example, transparency may be higher closer to the edges of the region 1305 to provide a smooth transition between the reference image and the selected region 1305 of the image with which it is blended. According to some embodiments, one or more display objects are presented in the graphical user interface 1100 to allow the user to control the characteristics of the mask employed in the blending.

Depending on the embodiment, the reference image 1303 is either automatically selected by the dynamic-image application or selected by the user from those images included in the stream of images selected with the selection tool 1206. According to one embodiment, selection of the reference image 1303 is optionally performed automatically or by user input, for example, the user can be prompted to select the approach used.

In the illustrated embodiment, the user employs a touch input on the graphical user interface 1100 to select the region of the image which is selected for the mask. According to these embodiments, the user can employ contact with the display 104 over a region of the graphical user interface 1100, for example, by sliding their fingertip across the display 104 of the device 102, 103 to select the region 1305. According to one embodiment, the user has the option to select the entirety of the reference image 1303 to be animated, for example, a display object can be presented the selection of which results in outputting a dynamic image in which animation is maintained throughout.

In the illustrated embodiment, the first display object 1304A provides an icon (for example, an image of paint brush) with which the user can draw a region in the image that determines the mask in the graphical user interface 1100. The second display object 1304B provides an icon (for example, an image of eraser) with which the user can modify the size and shape of a previously selected region 1305 by removing all or a portion of the selection. The third display object 1304C provides an icon (for example, an image of back arrow) with which the user can remove the previously selected region or portion thereof by undoing the preceding operation. The fourth display object 1304D provides an icon (for example, an image of a can of paint) with which the user can select the entirety of the image as the region to animate in the graphical user interface 1100. The fifth display object 1304E provides an icon (for example, an image of the strikethrough symbol) with which the user can clear the region in the graphical user interface 1100, for example, to start the mask-selection anew. According to various embodiments, selection of either the first display object 1304A or the second display object 1304B activates a menu that appears in the graphical user interface 1100 to provide the user with the option of choosing a width of the selected operation associated with the respective display object.

Referring now to FIG. 13B, the graphical user interface 1100 includes a dynamic image 1309, a second menu bar 1310 and a first menu bar 1311. In the illustrated embodiment, the first menu bar 1311 includes a first display object 1312A, a second display object 1312B and a third display object 1312C. The graphical user interface 1100 also includes a fourth display object 1314. According to the embodiment illustrated in FIG. 13B, the graphical user interface 1100 presents the user with an ability to preview the dynamic image and to add effects visible when the completed dynamic image is viewed.

According to some embodiments, the dynamic image 1309 is presented in the graphical user interface 1100 in substantially real time immediately following the selection of the region of the mask as illustrated in FIG. 13A. Further, the dynamic image 1309 is a result of the blending of the reference image 1303 with the region of others of the images included in the stream of images selected using the selection tool 1206 where the regions of the other images are identified using the selected mask. According to these embodiments, the dynamic image 1309 is generated from a second stream of images where the second stream of images includes the reference image and the respective regions of the other images included in the stream of images (for example, the stream of images selected using the selection tool 1206). In addition, the dynamic image includes an animated region having animation determined by the blending of the respective regions. As is described here, a limited number of touch inputs are required to produce the dynamic image 1309. For example, a first touch input to select the stream of images using the selection tool 1206 (see FIGS.

12A-12B) and a second touch input to select the region of the mask (see FIG. 13A). The preceding can be particularly useful for the easy generation of dynamic images.

In some embodiments, the dynamic image is continuously viewed with action in the animated region repeating itself. According to embodiments, a variety of effects can be added to the dynamic image 1309 to create a desired impact on viewers and to enhance the visual quality of the dynamic image as displayed. For example, the first display object 1312A provides an icon with which the user can select a first direction of movement (forward) in the animated region, the second display object 1312B provides an icon with which the user can select a looping feature in which the movement in the animated region loops in the selected direction and the third display object 1312C provides an icon with which the user can select a second direction of movement (reverse) in the animated region. In a further embodiment, the fourth display object 1314 provides an icon with which the user can adjust a speed at which movement in the animated region of the dynamic image is displayed.

Referring now to FIG. 13C, the graphical user interface 1100 includes a selection tool 1313, an image 1315, icons 1316 and a menu bar 1321. According to the illustrated embodiment, the menu bar 1321 includes a first display object 1332 and a second display object 1333 where selection of the first display object moves the process to the previous step in the dynamic-image generation process and selection of the second display object is selected by the user on completion of the generation of the dynamic image using the application. According to some embodiments, the user interface 1100 provides the user with tools by which to add further effects to the dynamic image. In the illustrated embodiment, the user interface 1100 provides the user with an ability to add distinctive colorization to the dynamic image. For example, the selection tool 1313 includes a plurality of icons 1316 each associated with one of a plurality of color filters that can be applied to the dynamic image, respectively. For example, the color filters can be applied to the entirety of the image to adjust the nature of the dynamic image by adjusting the color balance and/or the hue of in the image. According to the illustrated embodiment, the effects of the application of the color filters are applied and displayed in real-time in the image 1315 after their selection by the user. Further in the illustrated embodiment, the selection tool 1313 provides the user with a touch input with which the available filters represented by the icons 1316 can be scrolled through with a finger-swipe (for example, a left or right finger swipe) on the touch-sensitive display in the region of the selection tool 1313. According to this embodiment, selection of the filter is also done with a touch input. Further, the results of the application of the selected filter are immediately displayed in the graphical user interface 1100.

Various embodiments also provide an easy way for users to share the completed dynamic images they create with the application. Referring now to FIG. 13D, the graphical user interface 1100 includes a presentation of tools available for the identification and sharing the dynamic image. In the illustrated embodiment, the graphical user interface includes a first field 1320, a second field 1322, a selection tool 1324, a plurality of publication tools 1326 the menu bar 1325 and a display object 1327. According to one embodiment, the first field 1320 allows the user enter a title or other description concerning the dynamic image and the second field 1322 allows the user to enter one or more tags associated with the dynamic image. For example, the user may use the second field 1322 to associate the dynamic image with one or more file types or particular subject matter. The first selection tool 1324 can be used to activate or deactivate an additional feature such as geotagging which provides information of interest to viewers when the dynamic image is shared. In the illustrated embodiment, the plurality of publication tools 1326 are used to activate or deactivate sharing of the dynamic image via one or more social media tools and/or blogs, for example, the application host, Facebook, Twitter and Tumblr. As illustrated, the plurality of publication tools 1326 can be individually selected by the user in the application with the touch input such that anyone or any combination of publication venues can be selected. According to other embodiments, different combinations of tools can be presented in the graphical user interface 1102 to increase audience and/or interest in the dynamic image.

Referring now to FIGS. 14A-14D, a graphical user interface 1400 is illustrated as presented in a touch-sensitive display employed by the user to record a stream of images and output a dynamic image that is shared. According to some embodiments, the process illustrated with reference to FIGS. 14A-14D provides an even more streamlined process by which the user of the devices 102, 103 can create and share a dynamic image. In FIG. 14A, the graphical user interface 1400 allows the user to record a stream of images used to create a dynamic image. The graphical user interface 1400 includes an image 1401, a menu bar 1402, a first display object 1404, an element 1405 associated with the first display object, and a second display object 1406. In the illustrated embodiment, the first display object 1404 includes an icon with which the user can select a start of recording and a completion of recording. The associated element 1405 can include a timer where for example a maximum recorded time of the stream of images is limited by the dynamic-image application. According to these embodiments, the timer limits the recording time to capture a stream of images that fits within the maximum recorded time suitable for use with the application. The second display object 1406 provides the real-time display of a timeline that indicates an elapsed time and a current location in the stream of images currently displayed in the graphical user interface 1400.

According to one embodiment, the user records the stream of images up to a maximum amount of time established for the application. The stream of images is then automatically processed by the application to move directly from the act of recording to the display of a dynamic image. Referring now to FIG. 14B, the graphical user interface 1400 displays the dynamic image 1409 where the presentation of the dynamic image is a direct result of the user employing the application to record a stream of images. In the illustrated embodiment, the graphical user interface 1400 includes a first menu bar 1410, a second menu bar 1412, a first display object 1418A, a second display object 1418B, a third display object 1418C and a fourth display object 1418D.

According to some embodiments, following the recording of the stream of images, the dynamic image 1409 is generated and displayed as a result of processing that automatically occurs without further user interaction. For example, the dynamic image 1409 can include a result of an automatic selection of a reference image, an automatic selection of a region to animate and an automatic step of the blending process. In another example, the dynamic image 1409 can include a result of an automatic selection of a region to animate and an automatic skipping of the selection of a reference image, the stabilization process and the blending process. In a third example, the dynamic image 1409 can include the result of an automatic selection of a region to animate and an automatic stabilization process with respect to one or more reference images from the stream of images. According to these embodiments, the dynamic image 1409 is generated from a second stream of images where the second stream of images includes the reference image and the respective regions of the other images included in the stream of images and where the regions encompass entire images.

In the illustrated embodiment, the reference image is automatically selected as a particular image in the stream of images, for example, the first image in the stream of images, the last image in the stream of images or an image selected based on the characteristics of an object or objects in the image, as some examples. Further in the illustrated embodiment, the region to be animated is automatically selected as the entirety of the reference image. Other approaches can be employed, for example, the mask can automatically be selected as a particular object, shaded area, shape combination of the preceding or other characteristics of the reference image.

According to embodiments, a variety of effects can be added to the dynamic image 1409 to create the desired impact on viewers, for example, similar to the approaches described concerning FIG. 13B. For example, the first display object 1418A provides an icon with which the user can select a first direction of movement (forward) in the animated region, the second display object 1418B provides an icon with which the user can select a looping feature in which the movement in the animated region loops in the selected direction and the third display object 1418C provides an icon with which the user can select a second direction of movement (reverse) in the animated region. In a further embodiment, the fourth display object 1418D provides an icon with which the user can select a speed at which movement in the animated region of the dynamic image is displayed.

According to some embodiments, the process allows the user to select a region of the image 1409 in which animation will remain while other portions of the image 1409 not selected by the user remain static. For example, the graphical user interface 1400 can include one or more of the display objects illustrated in the first menu bar 1302 of FIG. 13A.

The illustrated embodiment also includes a fifth display object 1430 and a sixth display object 1431 each located in the menu bar 1410. In one embodiment, the fifth display object 1430 allows a user to move to the previous act in the dynamic-image generation process while the display object 1431 allows the user to move to the next act in the dynamic-image generation process.

Referring now to FIG. 14C, the graphical user interface 1400 includes a menu bar 1410, a selection tool 1413, an image 1415 and icons 1416. According to some embodiments, the user interface 1400 provides the user with tools by which to add further effects to the dynamic image, for example, in the manner previously described with reference to FIG. 13C. In the illustrated embodiment, the user interface 1400 provides the user with an ability to add distinctive colorization to the dynamic image. For example, the selection tool 1413 includes a plurality of color filters each represented by one of a plurality of icons 1416, respectively. These color filters can be applied to the dynamic image where the effects of the application of the color filters are displayed in the image 1415 after their selection by the user. For example, the color filters can be applied to the entirety of the image to adjust the nature of the dynamic image by adjusting the color balance and/or hue of the image. Further in the illustrated embodiment, the selection tool 1413 provides the user with a touch input with which the available filters can be scrolled through with a finger-swipe (for example, a left or right finger swipe) on the touch-sensitive display in the region of the selection tool 1413. According to this embodiment, selection of the filter is also done with a touch input by selecting one of the icons 1416. Further, the results of the application of the selected filter are immediately displayed in the graphical user interface 1400.

According to the illustrated embodiment, the graphical user interface 1400 includes a first display object 1417 and a second display object 1419. According to this embodiment, the first display object allows the user to adjust a contrast of the dynamic image when selected while the second display object is selected by the user to delete the dynamic image if desired.

Referring now to FIG. 14D, the graphical user interface 1100 includes a presentation of tools available for the identification and sharing the dynamic image, for example, in the manner previously described with reference to FIG. 14D. In the illustrated embodiment, graphical user interface includes a first field 1420, a second field 1422, a first selection tool 1424, and e-mail tool 1425 and a plurality of publication tools 1426. According to one embodiment, the first field 1420 allows the user enter a title or other description concerning the dynamic image and the second field 1422 allows the user to enter one or more tags associated with the dynamic image. For example, the user may use the second field 1422 to associate the dynamic image with one or more file types or particular subject matter of interest. The first selection tool 1424 can be used to activate or deactivate an additional feature such as geotagging that is of interest to viewers. In the illustrated embodiment, the e-mail tool 1425 allows the user to directly forward the dynamic image via e-mail. In one embodiment, a new e-mail window including the just-created dynamic image is automatically opened when the user selects the e-mail tool 1425. The user then enters at least one e-mail address to send the dynamic image to one or more desired correspondents. Further, the plurality of publication tools 1426 are used to activate or deactivate sharing of the dynamic image via one or more social media tools and/or blogs, for example, the application host, Facebook, Twitter and Tumblr. As illustrated, the plurality of publication tools 1426 can be individually selected by the user in the application with the touch input such that anyone or any combination of publication venues can be selected. According to other embodiments, different combinations of tools can be presented in the graphical user interface 1400 to increase audience and/or interest in the dynamic image.

Although primarily described with reference to a portable device, depending on the embodiment, the apparatus, systems and methods described herein can be implemented using portable or stationary devices, including devices having a temporary or permanent fixed location. Further, although some embodiments are described herein with reference to a touchscreen display, the apparatus, systems and methods described herein can be also be implemented using devices having other forms of display.

Although some embodiments described herein employ video recording systems to provide a stream of images, in some embodiments the dynamic-image does not include any audio when it is displayed.

Although illustrated as a combination of specialized hardware and software, various aspects of the system 100 such as the application, and/or services 120 can be implemented as specialized software executing in a general purpose computing device such as a PC, a laptop, a tablet computer or other handheld computing device. The computing device can include, for example, a processor connected to one or memory devices, such as a disk drive, flash drive, memory or other device for storing data. Depending on the embodiment, the computing device can communicate over hard-wired or wireless communication interfaces with one or more other devices including, for example, the host system. Accordingly, any of the embodiments described herein can include a non-transitory computer readable medium in which signals are stored that when executed by a processing system implementing aspects described herein. Further, in some embodiments, the system 100 can employ client and server computing devices, for example, in a configuration in which one or more of the devices (102, 103 and 105) operate as the client and the services 120 operate as the server.

Further, aspects can be implemented with a specially-programmed, special purpose hardware, for example, an application-specific integrated circuit (ASIC). Aspects of the invention can be implemented in software, hardware or firmware or any combination thereof. Such methods, acts, apparatus, systems, system elements and components thereof may be implemented as part of the computing system described above or as an independent component or components.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer implemented method for creating a looping video using an application operating on a device including a touch-screen graphical user interface presented in a display, the method comprising:
   acquiring a video stream including audio by employing the touch-screen graphical user interface to operate an application displayed in the touch-screen graphical user interface;
   generating a continuous loop from the acquired video stream, the application automatically limiting a length of the continuous loop to a maximum amount of time pre-determined by the application; and
   employing a single touch input to the touch-screen graphical user interface to acquire the video stream and automatically generate the continuous loop using the application.

2. The computer implemented method of claim 1, further comprising limiting, by the application, the maximum amount of time to less than 10 seconds.

3. The computer implemented method of claim 1, wherein the video stream is a first video stream, wherein the method further comprises generating, by the application, a second video stream including audio by a blending of a region of a frame included in the first video stream with a region of other frames included in the first video stream, respectively.

4. The computer implemented method of claim 3, further comprising defining the region to include an entirety of the frame included in the first video stream.

5. The computer implemented method of claim 4, further comprising defining the region with a mask.

6. The computer implemented method of claim 3, further comprising:
   recording the first stream of images with a mobile device; and
   following the act of recording, automatically completing the act of generating, by the application, the second video stream including audio by the blending of the region of the frame included in the first video stream with the region of other frames included in the first video stream, respectively, independent of any user input to the mobile device following the act of recording.

7. The computer implemented method of claim 1, wherein the act of generating the continuous loop, by the application, includes at least one of applying a filter, applying a cinematographic effect, and selecting a playback speed.

8. The computer implemented method of claim 1, wherein the single touch input is a first input, and wherein the method further comprises receiving a second touch input following the first input to select at least one social media forum with which to share the continuous loop.

9. A non-transitory computer-readable medium storing instructions whose contents cause a processing device including a touch-screen graphical user interface presented in a display to perform a method of creating a looping video, the method comprising:
   acquiring a video stream including audio by employing the touch-screen graphical user interface to operate an application displayed in the touch-screen graphical user interface;
   generating a continuous loop from the acquired video stream, the application automatically limiting a length of the continuous loop to a maximum amount of time pre-determined by the application; and
   employing a single touch input to the touch-screen graphical user interface to acquire the video stream and automatically generate the continuous loop using the application.

10. The non-transitory computer readable medium of claim 9, wherein the video stream is a first video stream, wherein the method further comprises generating, by the application, a second video stream including audio by a blending of a region of a frame included in the first video stream with a region of other frames included in the first video stream, respectively.

11. The non-transitory computer readable medium of claim 10, further comprising defining the region to include an entirety of the frame included in the first video stream.

12. The non-transitory computer readable medium of claim 9, wherein the single touch input is a first input, and wherein the method further comprises receiving a second touch input following the first input to select at least one social media forum with which to share the continuous loop.

13. The non-transitory computer readable medium of claim 9, wherein the video stream is a first video stream, wherein the processing device includes a mobile device, and wherein the method further comprises:
   recording the first stream of images with the mobile device;
   generating, by the application, a second video stream including audio by a blending of a region of a frame included in the first video stream with a region of other frames included in the first video stream, respectively; and
   following the act of recording, automatically completing the act of generating, by the application, the second video stream including audio by the blending of the region of the frame included in the first video stream with the region of other frames included in the first video stream, respectively, independent of any user input to the mobile device following the act of recording.

14. An apparatus comprising:
a display including a touch-screen graphical user interface;
one or more processors coupled to the display; and
a memory storing instructions that, when executed by the one or more processors, cause the one or more processors to perform operations including:
acquiring a video stream including audio by employing the touch-screen graphical user interface to operate an application displayed in the touch-screen graphical user interface; and
generating a continuous loop from the acquired video stream, the application automatically limiting a length of the continuous loop to a maximum amount of time pre-determined by the application,
wherein the acts of acquiring and generating are automatically accomplished by the application following a single touch input to the touch-screen graphical user interface.

15. The apparatus of claim 14, wherein the video stream is a first video stream, wherein the operations further include generating, by the application, a second video stream including audio by a blending of a region of a frame included in the first video stream with a region of other frames included in the first video stream, respectively.

16. The apparatus of claim 15, wherein the operations further include defining the region to include an entirety of the frame included in the first video stream.

17. The apparatus of claim 14, wherein the video stream is a first video stream, wherein the apparatus includes a mobile device housing the display, the one or more processors, and the memory, and wherein the operations further include:
recording the first stream of images with the mobile device;
generating, by the application, a second video stream including audio by a blending of a region of a frame included in the first video stream with a region of other frames included in the first video stream, respectively; and
following the act of recording, automatically completing the act of generating, by the application, the second video stream including audio by the blending of the region of the frame included in the first video stream with the region of other frames included in the first video stream, respectively, independent of any user input to the mobile device following the act of recording.

18. The apparatus of claim 14, wherein the single touch input is a first input, and wherein the operations further include receiving a second touch input following the first input to select at least one social media forum with which to share the continuous loop.

* * * * *